(12) United States Patent
Tanaka et al.

(10) Patent No.: US 6,795,803 B1
(45) Date of Patent: Sep. 21, 2004

(54) CD SYSTEM UTILIZING A VIRTUAL CD-R

(75) Inventors: Toshiharu Tanaka, Tokyo (JP); Koji Sasaki, Tokyo (JP)

(73) Assignee: Tomcat Computer Incorporated, Gunma (JP)

( * ) Notice: Subject to any disclaimer, the term of this patent is extended or adjusted under 35 U.S.C. 154(b) by 316 days.

(21) Appl. No.: 09/721,009

(22) Filed: Nov. 22, 2000

(30) Foreign Application Priority Data

Nov. 25, 1999 (JP) .......................................... 11-333650

(51) Int. Cl.[7] .............................................. G06F 3/00
(52) U.S. Cl. .............................. 703/24; 703/23; 710/7; 717/134; 345/757; 345/773
(58) Field of Search ................ 710/7; 703/23, 703/24; 717/134; 345/757, 773

(56) References Cited

U.S. PATENT DOCUMENTS 5,408,630 A * 4/1995 Moss .......................... 711/112

6,389,399 B1 * 5/2002 Yasuda ........................ 704/500

FOREIGN PATENT DOCUMENTS

JP            09-218751       *   8/1997

OTHER PUBLICATIONS http://www.kde.org/announcements/ZD-Innov-CeBIT99.php.*
http://www.virtualcd-online.com.*

* cited by examiner

Primary Examiner—Jeffrey Gaffin
Assistant Examiner—Justin Knapp
(74) Attorney, Agent, or Firm—TraskBritt

(57) ABSTRACT

A CD (compact disc) system is provided in a software form, by which a virtual CD-R (compact disc recordable) can be formed on a computer, and an actual CD-R can be easily and quickly formed from this formed virtual CD-R. While original data is processed, a virtual CD-R is formed in accordance with a structural requirement of a CD into a storage means employed in the computer. Furthermore, an actual CD-R is formed from the above-explained CD-R.

8 Claims, 25 Drawing Sheets

C: —— CDEXPL —— TOMCATCD —+— DISCINFO.TVC
　　　　　　　　　　　　　　+— DISCINFO.ICO
　　　　　　　　　　　　　　+— TRACK01.WAV
　　　　　　　　　　　　　　+— TRACK02.WAV
　　　　　　　　　　　　　　+— TRACK03.WAV

| HEADER PORTION | INFORMATION OF ENTIRE DISC, INFORMATION OF RESPECTIVE TRACKS, COMPRESSION INFORMATION |
|---|---|
| DATA PORTION | DATA RECORDED ON EACH TRACK ⋮ |

CD SYSTEM UTILIZING A VIRTUAL CD-R

BACKGROUND OF THE INVENTION

1. Technical Field

The present invention generally relates to a CD (compact disc) system. More specifically, the present invention is directed to such a CD system arranged by that while a virtual CD-R (compact disc recordable) system (involving a virtual CD-R drive and a virtual CD-R disc) is constructed in a storage means such as a computer hard disk drive provided in a computer and this accessible virtual CD-R system is recognized as a CD-R drive from CD-R writing software, a virtual CD-R is constituted in accordance with the structural requirement of the compact disc, and also an actual CD-R can also be formed (duplicated) by utilizing the formed virtual CD-R as a master compact disc.

2. Prior Art

In an earlier stage, CDs (compact discs) have been marketed as music CD (CD-Digital Audio), and have been widely popularized.

Since such music CDs are popularized in the worldwide market, these CDs could constitute very low-cost media, and therefore, these CD media could be widely marketed as CD-ROMs (Compact Disc Read-Only Memory) designed for computers. While various features owned by these CDs are realized, for instance, easy random accessible functions and non-rewritable functions, the CDs could be progressed with employment of various formats. This sort of CD-ROM is manufactured in the mass production manner by introducing the stamping method in view of low cost aspect. This CD-ROM owns such a structural feature that only data writing operation is allowable, but data cannot be additionally written thereinto but also cannot be deleted therefrom.

A CD-R which has been marketed as a rewritable (recordable) CD is manufactured in such a manner that while an exclusively-used CD-R drive is used, data is written into an exclusively-used medium having a rewritable structure by using a laser under control of CD-R writing software so as to finally form a desirable CD. This CD may be read in the normal manner by employing the normal CD-ROM drive. However, in accordance with the principle idea, it is practically impossible to delete only such a data portion which is random accessed within the once written data. A data arrangement of a CD-ROM which may constitute a portion of structural requirements of a CD is shown in FIG. 1(A), and is given as follows: A lead-in data portion, data, and a lead-out data portion are arranged from an inner peripheral side of the CD-ROM disc in this order. In a CD-R, as represented in FIG. 1(B), two areas constituted by both a PCA (Power Calibration Area) and a PMA (Program Memory Area) are formed in an inner peripheral portion of an area where data is recorded. In the lead-in data area, a TOC (Table Of Contents) is written and this TOC indicates a track number (track quantity), and address information (both starting position and end position) of a track. The lead-out data area indicates that final data of this CD-R is reached. In a practical case, no sound data is written into the lead-out data area. Also, the PCA area corresponds to an area where intensity of laser during data writing operation is controlled. The PMA area corresponds to an area which is used to record such data indicative of both starting position/ ending position of a written track. The address information described in the TOC is rewritten from the PMA area.

The CD-R writing software is employed so as to control such a writing operation that original data, music information, and the like are written into a CD-R in a format reproducible in a CD-ROM drive in accordance with such a data arrangement of a CD.

Although the original data may be written into the CD-R by way of the CD-R writing software, the data writing speed is very slow. Also, erroneous writing operation will occur due to a buffer under run and/or a media failure. As a result, a speed test and/or a writing test are necessarily required. Unless the written CD-R is tested by using a computer equipped with a CD player and a CD-ROM drive, a large number of CDs could not be copied, or duplicated while using this written CD-R as a master CD-R disc. In other words, a series of the above-explained works must be required until a technically complete master CD-R disc could be obtained.

The present invention has been made to solve the above described problems, and therefore, has an object to provide such a CD-R system in a computer software form in such a manner that while a virtual CD-R system containing both a virtual CD-R drive and a virtual CD-R disc is constituted on a computer, a virtual CD can be quickly formed in a very simple manner by clicking a virtual device displayed on windows (display screen) by way of a mouse and the like. At the same time, after the virtual CD has been tested by a reproducing test and an implementation test within the computer, an actual CD-R can be readily and quickly formed from the virtual CD-R while this tested virtual CD is used as a master virtual CD-R.

SUMMARY OF THE INVENTION

The present invention is directed to a CD system, and the above-explained object of the present invention may be achieved by that while original data is processed, a virtual CD-R system is constituted in a storage means employed in a computer, by which a virtual CD can be formed in accordance with a structural requirement of a CD, and this virtual CD-R system can be recognized as a CD-R drive by way of CD-R writing software, and furthermore, software capable of forming an actual CD-R from the virtual CD-R is provided.

Also, the object of the present invention may be achieved by providing such a CD system in which: a virtual CD-R system is constructed in a storage means employed in a computer, and the virtual CD-R system is recognized in a similar manner to an actual CD-R drive by way of normal actual CD-R writing software, and the virtual CD-R system can be accessed and can form a virtual CD-R by using the normal actual. CD-R writing software; and in which: the CD system is comprised of a virtual drive panel capable of performing such operations that the virtual CD is inserted with respect to a virtual drive, a virtual blank CD is formed/mounted, and the virtual CD is ejected; and also capable of displaying such operation conditions as reading/ writing of the virtual drive.

Furthermore, the above-described object of the present invention may be achieved by that a program capable of cooperating a CD-R writing program part, a virtual CD-R interface program part, and a virtual CD-R drive program part, is stored into a storage means employed in a computer; the CD-R writing program part is capable of performing a CD-R writing operation with respect to a virtual CD-R drive in a similar manner to that of an actual CD-R; the virtual CD-R interface program part is capable of realizing a user interface and a control operation, which are required for the virtual CD-R drive; and also the virtual CD-R drive program part is capable of constructing and controlling the virtual CD-R.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

The present invention has been accomplished by proposing an epoch-making CD (compact disc) system suitable for a network age. In accordance with the technical idea of the present invention, even when notebook type personal computers having no CD-ROM function, no CD-R function, and also no CD-RW (Compact Disc Rewritable) function may enjoy CDs and may form master CDs (virtual master CD-R), virtual master CD-R may be directly written into actual CDs by using a CD-R-equipped machine, and further, the virtual master CD-R may be transferred to another CD-R-equipped machine connected to a network so as to be written into another actual CD. Also, a virtual disc may be stored into a network drive, a removable disk, and the like. As operations which may be required for a virtual CD-R system, the virtual CD-R system is restarted; the virtual CD-R is ended; the virtual CD-R is not displayed; the virtual CD-R is brought into a waiting state; the virtual CD-R is displayed; the blank virtual CD is formed and mounted; the blank virtual CD-R is mounted; the virtual CD-R is mounted; the closed virtual CD disc is opened; and the virtual CD is deleted.

Such operations are very cumbersome. That is, software operated on a CD-ROM is used; every time a CD is formed/edited, the CD is ejected to be inserted (mounted) into either a CD-ROM drive or a CD-R drive. Also, even when a plurality of CDs are desired to be operated, in such a case that only one set of either the CD-ROM drive or the CD-R drive, a difficult operation may occur. However, in accordance with the present invention, since a virtual CD-R is used, a CD may be formed and saved in the form of a file in a storage unit such as a hard drive by using a virtual processing method. Thus, a virtually-processed may be used, while a user could have such a feeling that an actual CD-ROM drive, or an actual CD-R drive is used. Also, a writing operation to a CD-R may be quickly written. Furthermore, when plural sets of CD-ROMs, or plural sets of CD-Rs are provided, plural sheets of CDs and/or CD-Rs may be operated at the same time in a similar manner that plural sets of CD-ROM drives and/or CD-R drives were connected.

Over Arrange of CD System

Next, a description will now be made of a concrete arrangement of a CD system according to an embodiment of the present invention.

Figure 1:
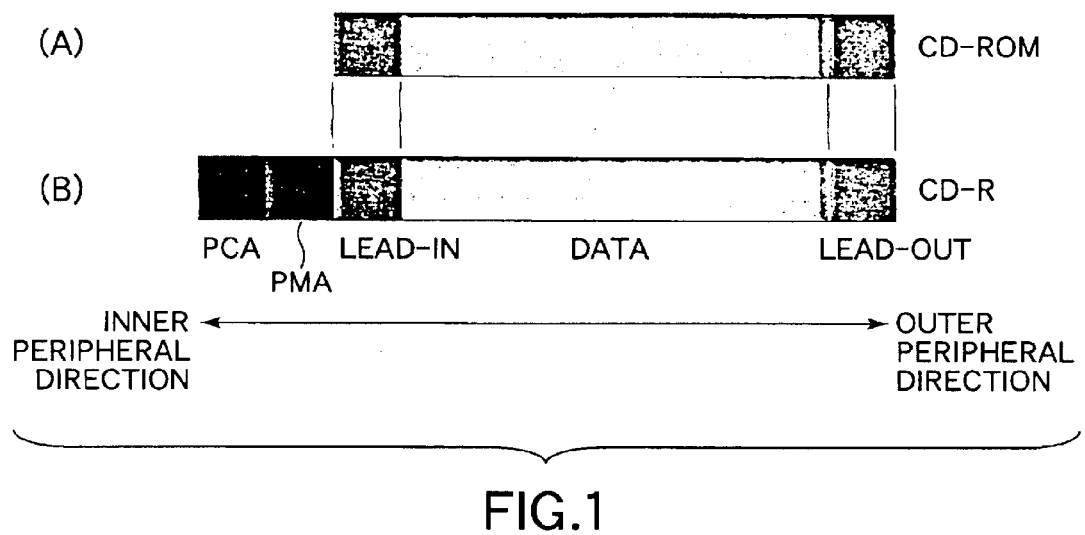
FIG. 1 is an explanatory diagram for explaining a data arrangement of a CD.
Figure 2:
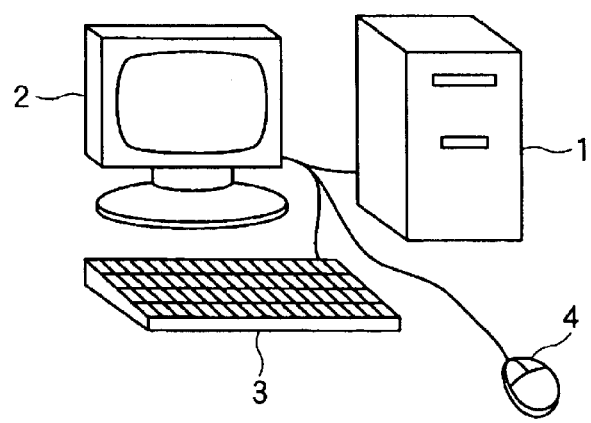
FIG. 2 is a schematic diagram for representing a hardware structural example of a CD system according to the present invention.

In order to arrange a CD-R writing system, as indicated in FIG. 2, an actual CD-R drive is necessarily equipped under general-purpose hardware environment of a personal computer. That is to say, a CD-R writing system according to the present invention is arranged by a CPU unit 1 having a copy/drive function of a CD and an FD (floppy disk), a display unit 2 such as a CRT and a liquid crystal display, a keyboard 3 and also a mouse 4, which are used to input data and/or commands. Although the actual CD-R drive is not necessarily required to be equipped with the virtual CD-R writing system of the present invention, first of all, such a virtual CD-R drive capable of similarly handling a virtual CD-R as an actual CD-R is required to be constituted based upon an OS (Operating System), application software, and writing software as the hardware environment. In contrast with this virtual CD-R drive, a virtual CD-R system of the CD system, according to the present invention, is arranged by a CD-R writing program part, a virtual CD-R interface program part, and a virtual CD-R drive program part. The CD-R writing program part (will be referred to as a "CD-Maker" hereinafter) is capable of executing a virtual CD-R writing operation similar to that of an actual CD-R. The virtual CD-R interface program part (will be referred to as a "Virtual CD-R" hereinafter) is capable of realizing a user interface and a control, which are required, since this drive corresponds to the virtual CD-R drive. The virtual CD-R drive program part (will be referred to as a "Virtual CD-RD" hereinafter) constitutes the above-explained virtual CD-R, and controls this constituted virtual CD-R.

Virtual CD-R System

The CD system according to the present invention is constituted by employing such a program (will be referred to as a "CD-Master" hereinafter) which may manage/control conjunction operations of the above-described three sets of programs. Among the above-explained three sets of programs, two sets of both the Virtual CD-R and the Virtual CD-RD may constitute a virtual CD-R system (will be referred to as a "Virtual CD-R" system hereinafter) capable of achieving the basic function of the present invention.

Figure 3:
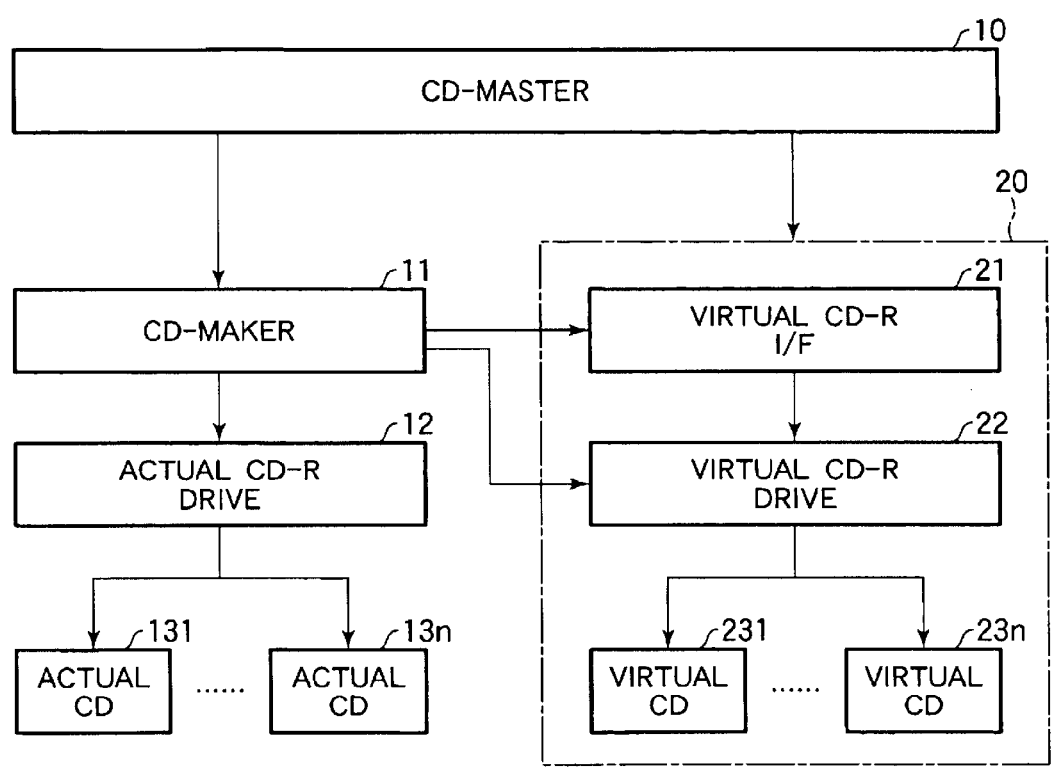
FIG. 3 is a block diagram for schematically indicating a conjunction operation example of the CD system according to the present invention.

FIG. 3 represents a relationship between the above-explained three programs and these conjunction operations thereof, and another relationship between these three programs and a CD-Master 10 corresponding to a program capable of managing/controlling this relationship. The CD-Master 10 start up a CD-Maker 11, and this CD-Maker 11 produces actual CDs 131 to 13n via an actual CD-R drive 12. Also, the CD-Maker 11 drives a Virtual CD-R drive 22 via a Virtual CD-R interface 21 employed in a Virtual CD-R system 20 in conjunction with the Virtual CD-R system 20, and then, this virtual CD-R drive 22 produces a virtual CD 231 through a virtual CD 23n.

CD-Master 10

Figure 4:
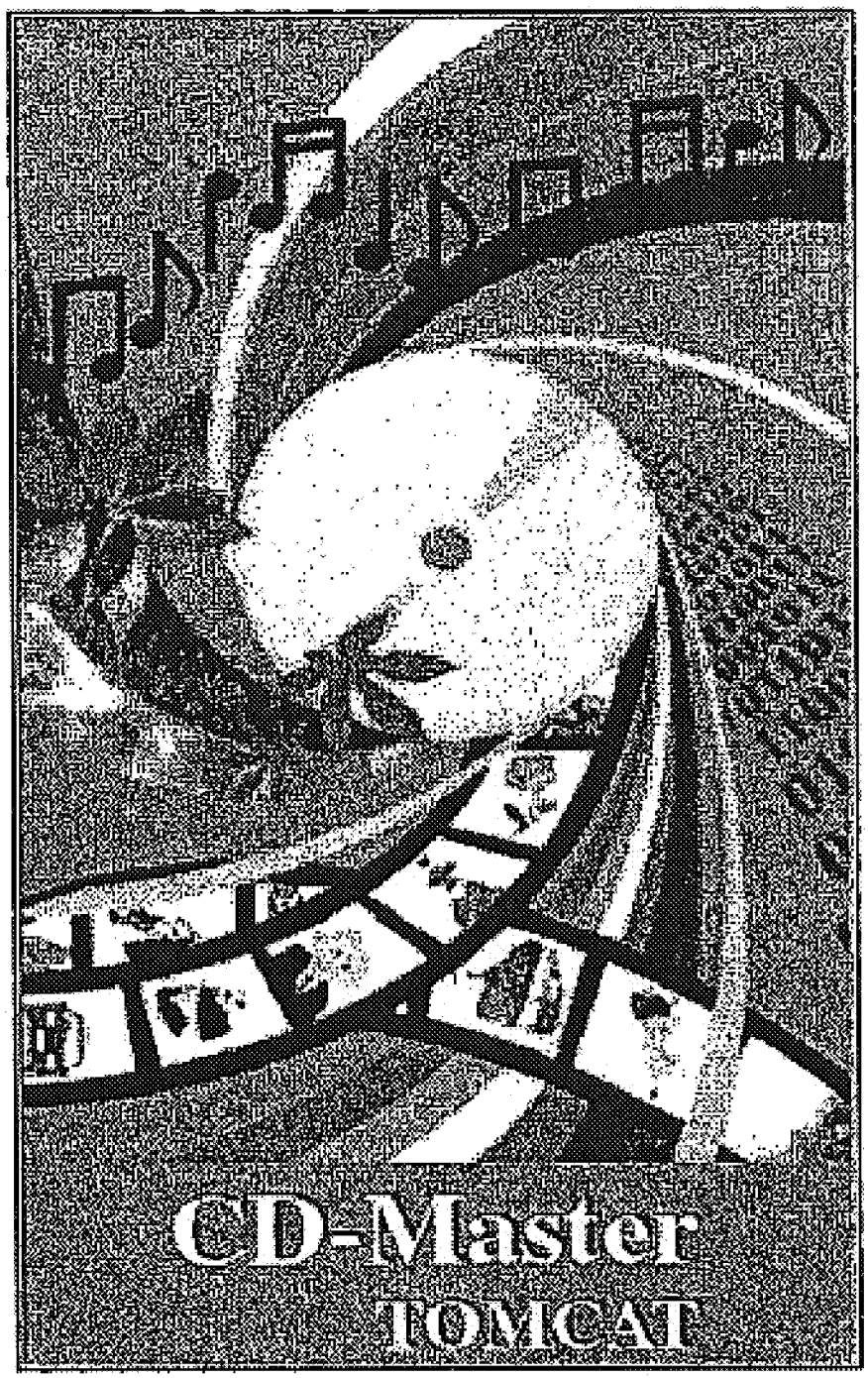
FIG. 4 is a diagram for representing an example of an opening screen of a CD-Master employed in the CD system.
Figure 5:
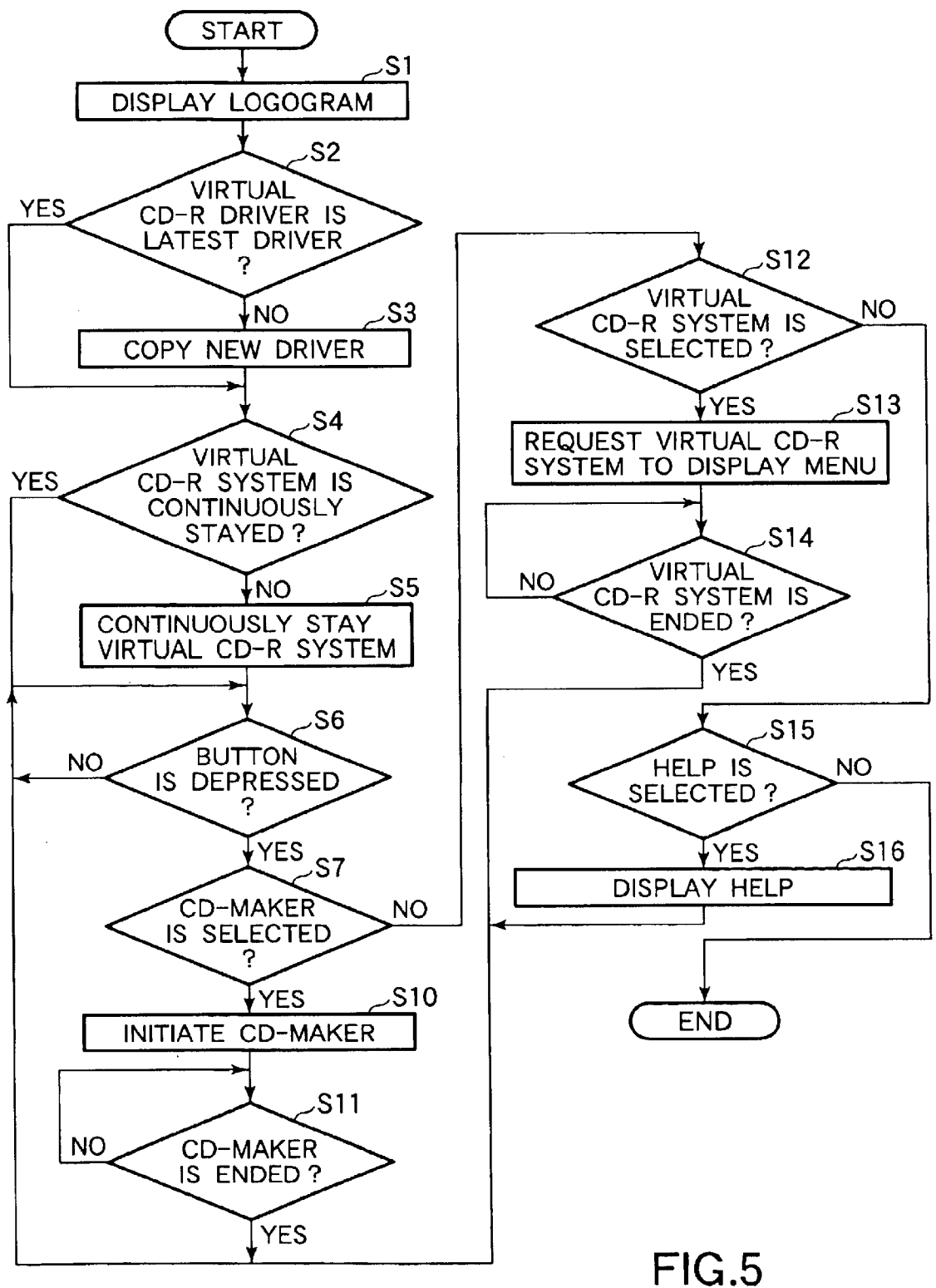
FIG. 5 is a flow chart for explaining an example of operations of the CD-Master.
Figure 6:
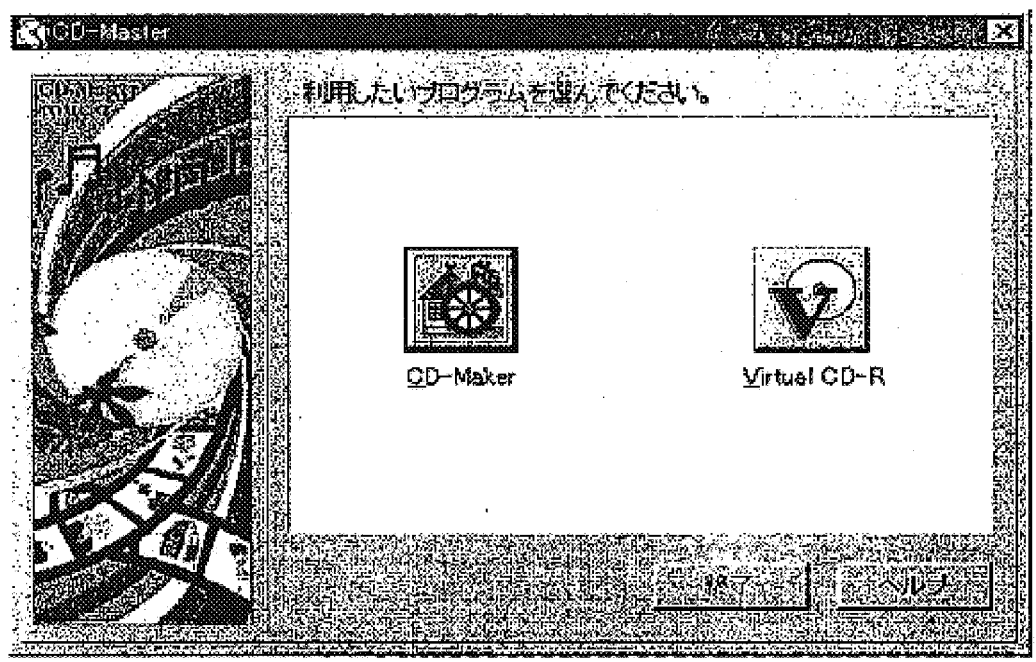
FIG. 6 is a flow chart for describing an example of a menu screen of the CD-Master.

First, a description will now be made of the CD-Master 10. The CD-Master 10 may play the following roles: The CD-Master 10 causes the above-explained three sets of program parts to be operated in conjunction with an operation of a user, and guides a use method of a user. A start up screen of the CD-Master 10 is indicated in FIG. 4. The operations of this CD-Master 10 are described in a flow chart shown in FIG. 5. That is, when the CD-Master 10 is operated, after a logogram of the CD-Master 10 has been displayed for several seconds (step SI), a menu window (that is Japanese Version) as indicated in FIG. 6 is displayed so as to call the respective functions, and then, a selection by a user is waited. The four functions which may be selected by the user are given as follows: (1) the CD-Maker 11 is used; (2) the Virtual CD-R system 20 is used; (3) "help" is displayed; and (4) the CD-Master 10 is closed. In other words, a check is made as to whether or not the Virtual CD-R driver corresponds to the latest Virtual CD-R driver (step S2). When the virtual CD-R driver is not the latest Virtual CD-R driver, a new driver is copied (step S3), and another check is made as to whether or not the Virtual CD-R system is continuously stayed (step S4). When the Virtual CD-R system is not continuously stayed, the Virtual CD-R system is continuously stayed (step S5), and the process operation waits for a depression of a button (step S6).

When the button is depressed, another check is made as to whether or not the CD-Maker 11 is selected (step S7). In the case that the CD-Maker 11 is selected, this CD-Maker 11 is started up (step S6), and then the process operation waits for a completion of this CD-Maker 11 (step 511). When the operation of the CD-Maker 11 is accomplished, the process operation is returned to the above-explained step S6.

To the contrary, in the case that when the CD-Maker 11 is not selected at the step S7, a judgment is made as to whether or not the Virtual CD-R system 20 is selected (step S12). When the Virtual CD-R system 20 is selected, the Virtual CD-R system 20 is requested to display the menu (step S13). Then, the process operation waits for the completion of the Virtual CD-R system 20 (step S14), and then is returned to the above-explained step S6. In the case that the Virtual CD-R system 20 is selected at the step S12, a check is made as to whether or not the "help" is selected (step S15). When the "help" is selected, the content of "help" is displayed (step S16), and then the process operation is returned to the above-described step S6. To the contrary, when the "help" is not selected, this process operation is accomplished.

CD-Maker 11

While the CD-Maker 11 may play a very important role in order to realize the CD system according to the present invention, this CD-Maker 11 is substantially equal to the normal CD-R writing software used to the writing operation for actual CD-R discs in view of the technical aspect. Actually, the CD-Maker 11 owns such a necessary function sufficiently capable of executing a CD-R writing operation for an actual CD-R disc via an actual CD-R drive. Moreover, since a major portion of the operations of the actual CD-R system 20 is equal to such an operation realized by emulating the operation of the actual CD-R, various sorts of operations of the CD-Maker 11 with respect to a virtual CD-R (for instance, read/write/reproduce/copy operations) are identical to those realized by the normal CD-R writing software except for a partial operation thereof.

That is, the CD-Maker 11 owns the below-mentioned different technical aspect from the normal CD-R writing software. While the writing operation is carried out with respect to both the virtual CD-R drive and the virtual CD-R disc, in principle, there is no failure in the writing operation due to the characteristic of the virtual CD-R. As a result, this CD-Maker 11 may own such a process operation that the writing operation for the virtual CD-R disc can be carried out, while omitting the writing test and the speed test, which are required before the writing operation to the actual CD-R disc is performed. Also, the CD-Maker 11 owns another different process operation, as compared with the normal CD-R writing software such as the erasing system in which although the actual CD-R disc is rewritable, lengthy erasing time is required. That is, while utilizing another characteristic of the virtual CD-R, i.e., the high-speed accessing characteristic and also the instantaneous data rewriting characteristic for the partial, or entire data, the image file of the virtual CD-R is directly cleared.

Pre-Processing Operation

Next, a pre-processing operation is explained which corresponds to a process operation executed before the CD-Maker 11 enters into the conjunction operation with the Virtual CD-R system 20. Thereafter, both an overall operation of the CD-Maker 11, and a writing operation as to a CD Extra format CD among the various operations of the CD-Maker 11 will be explained while picking up forming/writing operations of various sorts of CD formats as a typical example. In this CD Extra format CD, both data and musical information can be recorded thereon with maintaining a coexistence relationship.

Figure 7:
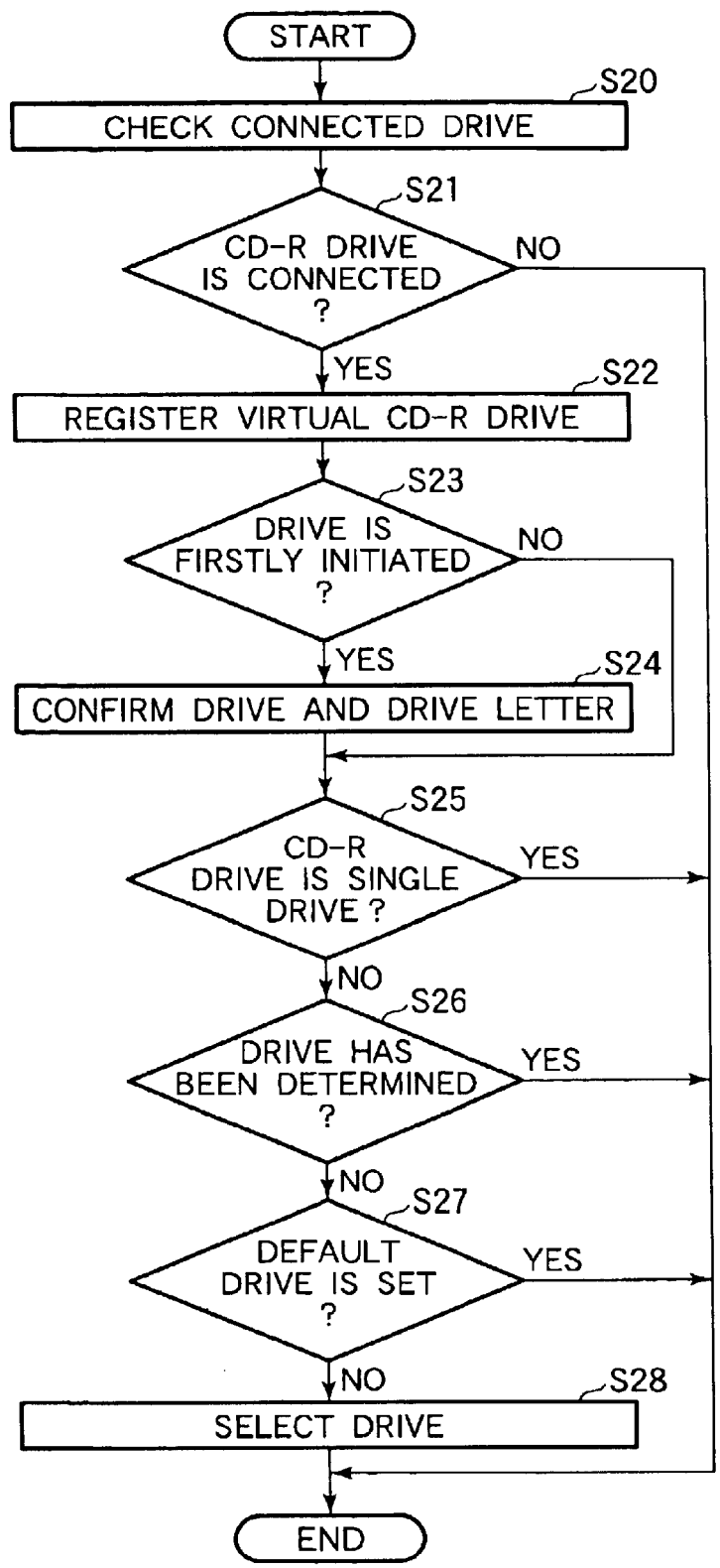
FIG. 7 is a flow chart for describing an operation example of a pre-processing operation by the CD-Maker.

FIG. 7 is a flow chart for describing an example of the pre-processing operation. In this flowchart, a check is made as to whether or not a CD-R drive is connected (step S21), while any drive under connection is firstly investigated (step S20). When the CD-R drive is connected, a virtual CD-R drive is registered (step S22). Subsequently, a judgment is made as to whether or not the virtual CD-R drive is started up in the first time (step S23). When the virtual CD-R drive is started up the first time (step S23), both a drive and a drive letter are confirmed (step S24), and a judgement is done as to whether or not the connected CD-R drive corresponds to one CD-R drive (step S25). To the contrary, when the connected CD-R drive is not equal to one CD-R drive, a check is made as to whether not the drive has been determined by way of the relationship (step 26). When the drive has not yet been determined, a check is done as to whether or not a default drive is set (step S27). When the default drive is not set, the drive is selected and then the pre-reprocessing operation is ended (step S28).

Figure 8:
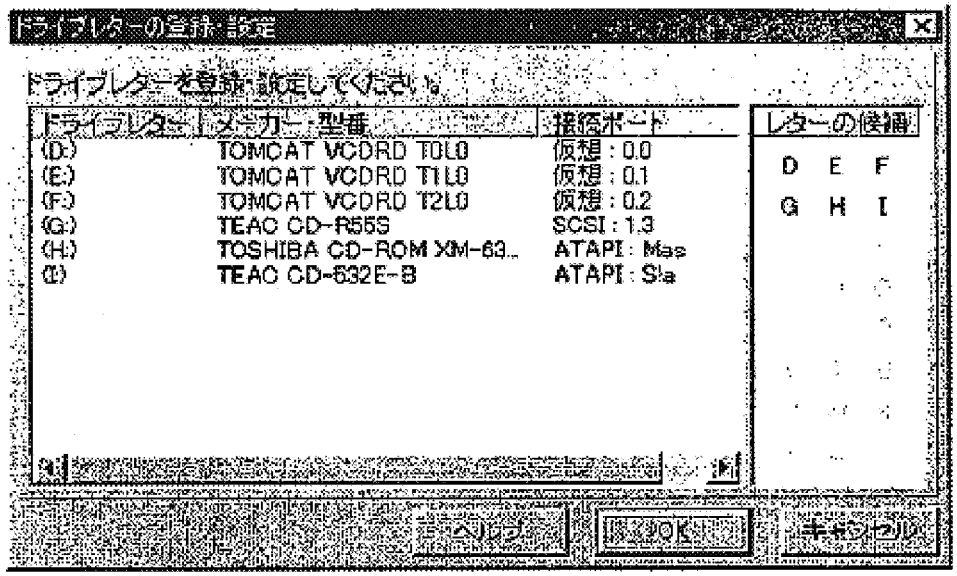
FIG. 8 is a diagram for indicating a registration screen of a drive letter.
Figure 9:
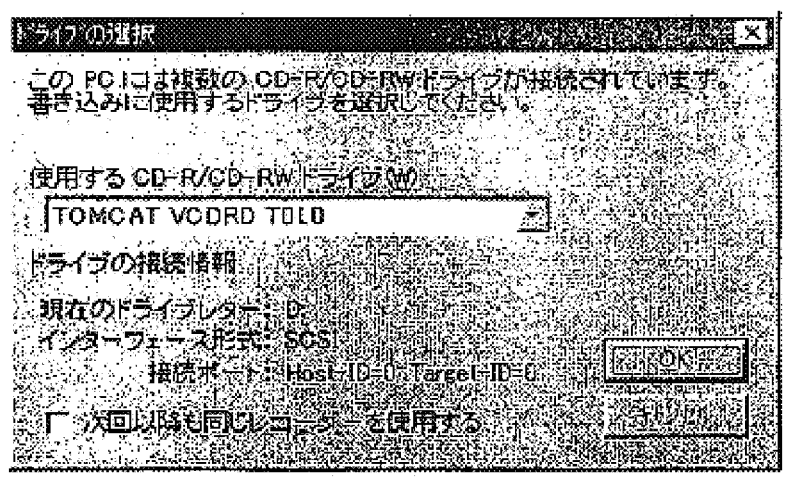
FIG. 9 is a diagram for showing a selection screen example of plural CDs.

It should be noted that this pre-processing operation is accomplished when the CD-R drive is not connected at the step S21; when the CD-R drive is one drive at the step S25; when the drive has been determined at the step S26; and when the default drive is set at the step S27. Also, the confirmations as to both the drive and the drive letter are carried out on the display screen (that is Japanese Version) shown in FIG. 8 at the step S24. When any error is present in the drive and/or the drive letter, the error content is corrected/changed on this display screen. In the case that the drive is selected at the step S28, this drive selection is carried out on a display screen (that is Japanese Version) shown in FIG. 9.

In the case that the CD-Maker 11 is selected to commence the operation, the CD-similar drive connected to the computer is investigated, and such a drive usable by the own user is listed up as a candidate. If the virtual CD-R system 20 is continuously stayed and driven in advance, then a virtual CD-R drive is recognized by the CD-Maker 11 as a usable drive to be registered. Under such a condition that the Virtual CD-R system 20 is continuously stayed/operated, the CD-Maker 11 normally may handle these drives as actual CD-R drives without any discrimination, and both the process operations and the operations executed in the case of the actual CD-R disc are similarly carried out even for the virtual CD-R disc. Also, since the completely same responses issued in the case of both the actual CD-R drive and the actual CD-R disc are returned to the CD-Maker 11 from the Virtual CD-R system 20, the CD-Maker 11 can execute the process operation such as the writing operation to the Virtual CD-R system 20 under normal condition.

Operation of CD-Maker 11

Figure 10:
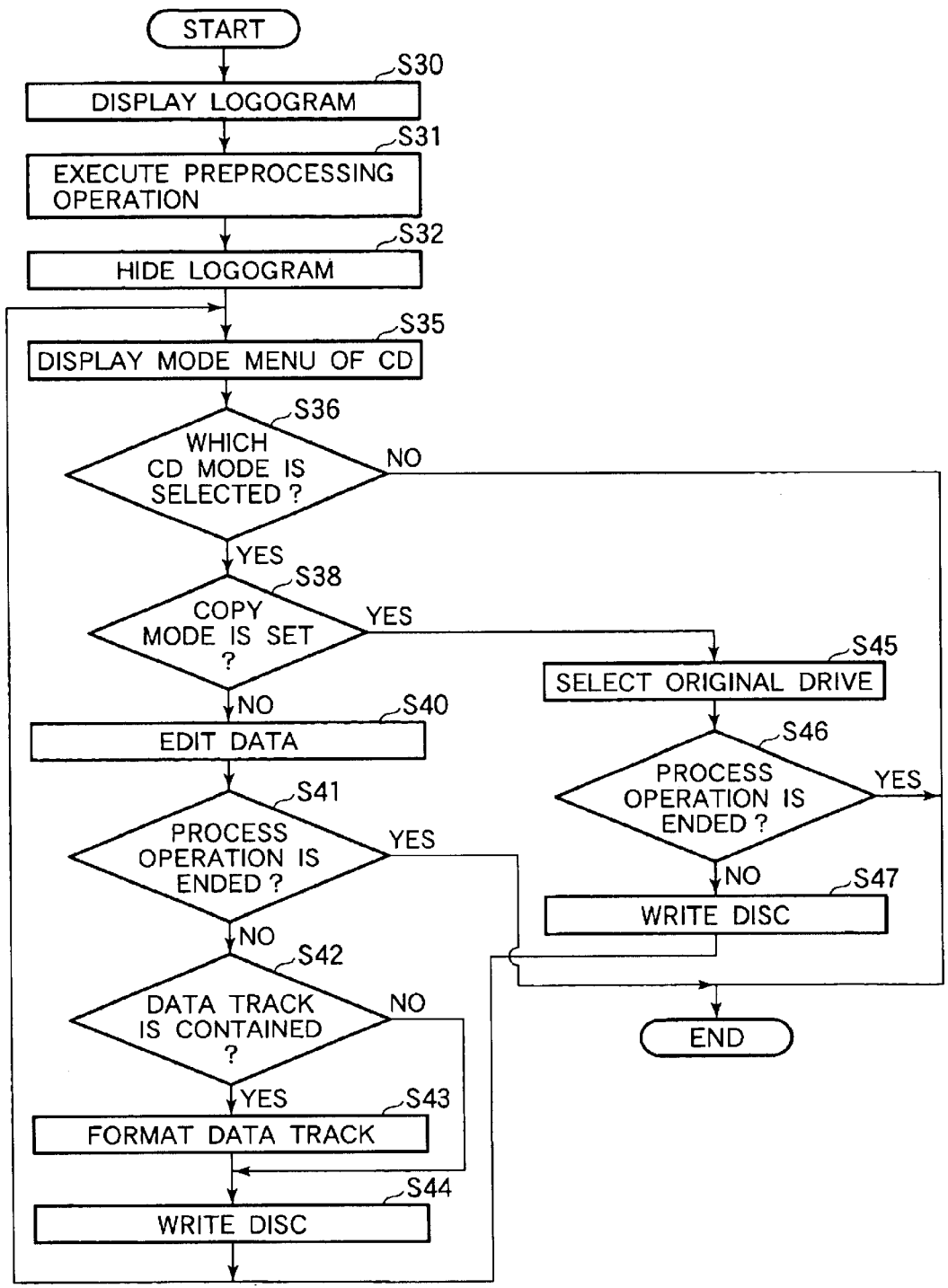
FIG. 10 is a flow chart for explaining an operation example of the CD-Maker.
Figure 11:
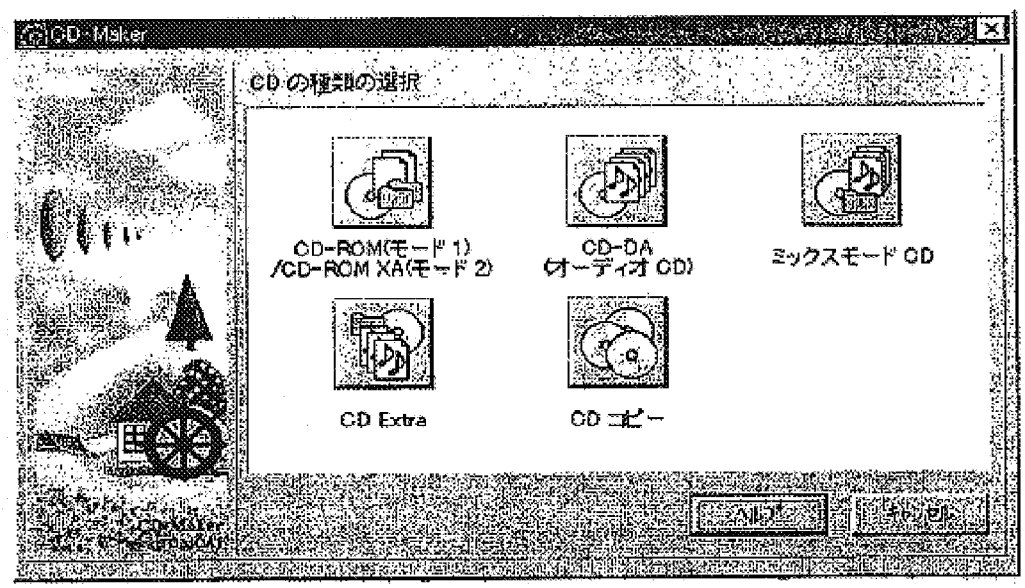
FIG. 11 shows a display screen example in the case that formats of the CD-Maker are selected.

A typical operation of the CD-Maker 11 is indicated in a flow chart of FIG. 10. In this flow operation, a logogram is firstly displayed (step S30), a necessary pre-processing operation is carried out (step S3 1), the logogram is hidden from the display screen (step S32), and also a mode menu of a CD is displayed (step S35). Then, a check is made as to which mode of the CD is selected (step S36). Another check is done as to whether or not this selected mode corresponds to a copy mode (step S38). In such a case that none of CD mode is selected at the previous step S36, this process operation is completed. When any mode other than the copy mode is selected at the step S38, data is edited (step S40), and then, a judgment is made as to whether or not the process operation is ended (step S41). When the process operation is not yet ended, a further check is done as to whether or not a data track is contained (step S42). Then, when the data track is involved, the data track is formatted (step S43). Furthermore, a disc is written (step S44), and the process operation is returned to the step S35. In the case that the copy mode is selected at the step S38, a drive functioning as a read source is selected (step S45), and then, a check is done as to whether or not the process operation is ended (step S46). When the process operation is not yet ended, the disc is written (step S47), and then the process operation is returned to the previous step S35. It should also be noted that the format is selected by using a display screen (that is Japanese Version) as shown in FIG. 11.

Figure 12:
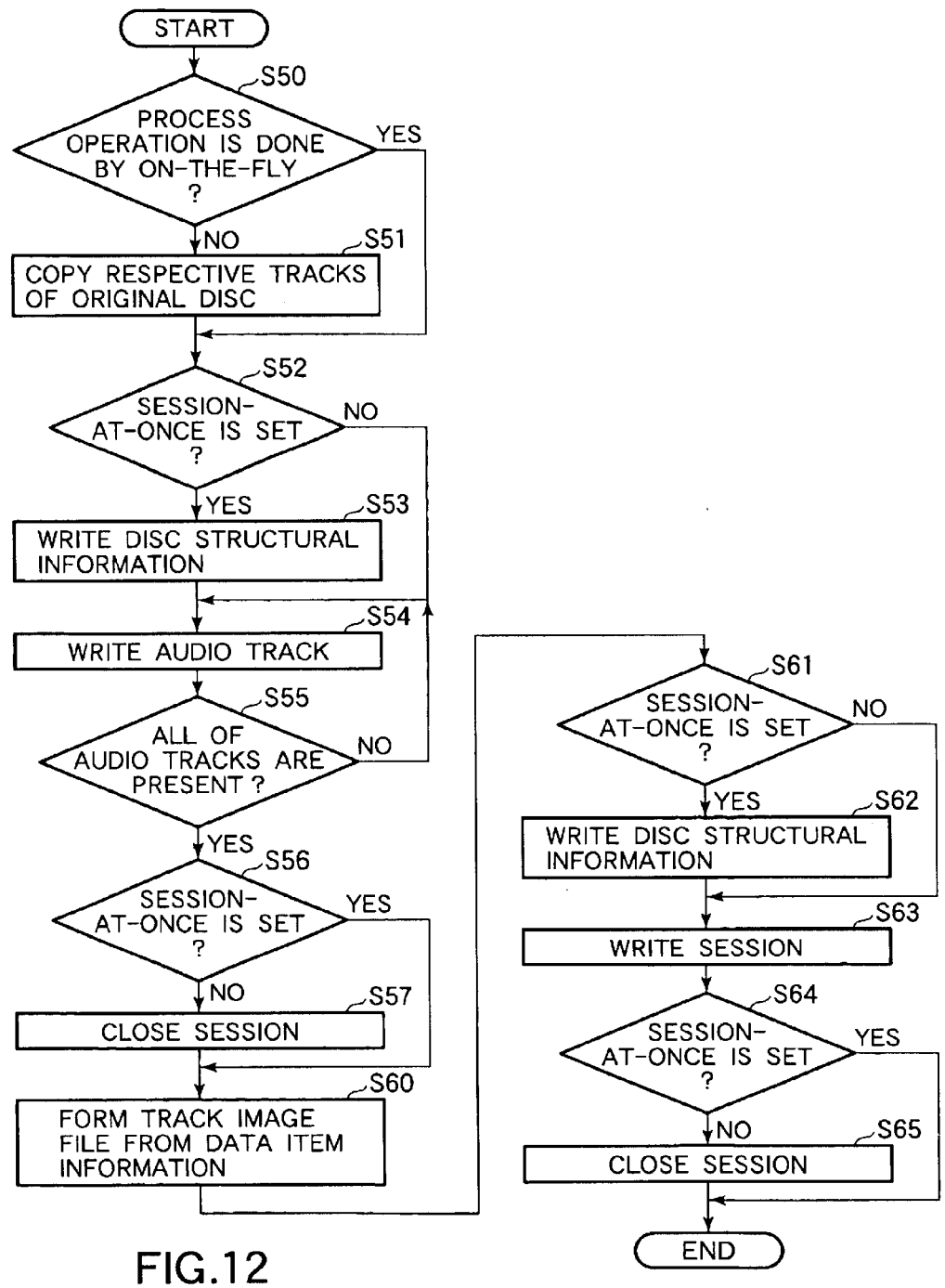
FIG. 12 is a flow chart for explaining a forming example of a CD-Extra employed in the CD system according to the present invention.

FIG. 12 is a flow chart for explaining a processing method used to write a CD having a CD Extra format. A CD having a CD Extra format corresponds to such a CD that a first session corresponds to an audio CD, and a session subsequent to the first session corresponds to a data, CD. In other words, a check is made as to whether or not a process operation by an on-the-fly is carried out (step S50), the respective tracks of the original disc are copied to a file (step S51), and then, a check is made as to whether or not a session-at-once is set (step S52). When the session-at-once is set, disc structural information is written (step S53). Subsequently, an audio track is written (step S54), and all of the audio tracks are written (step S55). Then, a check is done as to whether or not a session-at-once is set (step S56). When the session-at-once is not set, the session is closed (step S57), a track image file is formed from data item information (step S60), and furthermore, another check is done as to whether or not the session-at-once is set (step S61). If the session-at-once is set, then the disc structural information is written (step S62), the session is written (step S63), and another check is made as to whether or not the session-at-once is set (step S64). If the session-at-once is not set, then the session is closed and the process operation is ended (step S65).

Figure 13:
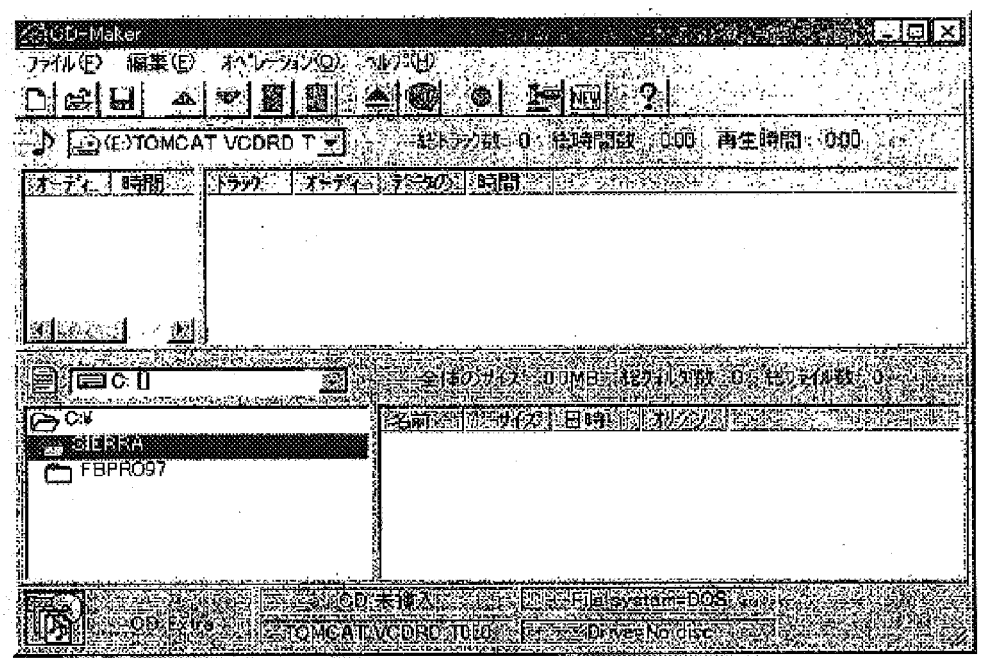
FIG. 13 is a diagram for indicating a display screen for editing the CD-Extra.
Figure 14:
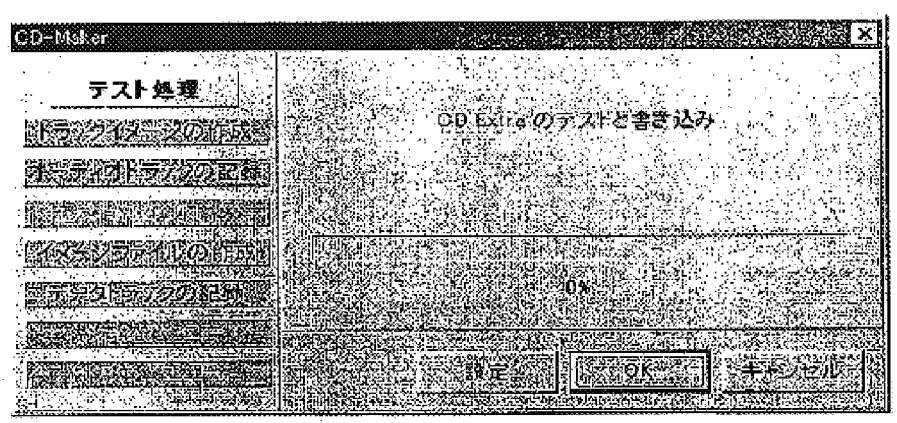
FIG. 14 is a diagram for showing an example of a progress screen of the CD-Extra.

It should be understood that FIG. 13 shows a display screen example (that is Japanese Version) while the CD having the CD Extra format is edited, and FIG. 14 represents a progress display screen example (that is Japanese Version).

In the case that a process operation required to write a CD disc is performed, such a process operation may be continuously carried out with respect to CDs having various formats in such a manner that a format of a CD-ROM is used as to a data portion, and a CD-DA format is used as to an audio portion of music. As explained above, the CD-Maker 11 owns various functions in order that this CD-Maker 11 may support the writing operations of the various formats of the CD, and also the writing operation may be correctly prepared to be processed in accordance with the structural requirements of a CD with respect to an actual CD-R drive and an actual CD-R disc (will be referred to as an "actual CD-R system" hereinafter). As these functions, a speed test, a writing test, an edition of write data, and image file forming are prepared. However, the Virtual CD-R system 20 which may constitute the basic function of the present invention may be arranged based upon such a virtual designing idea by which all of signals as well as information can be transmitted/received in a similar manner to that of the real CD-R system. That is to say, the CD-Maker 11 basically equal to the CD-R writing program issues all of the signals and all of the information with respect to the actual CD-R drive. Otherwise, the CD-Maker 11 receives all of the signals and all of the information from the actual CD-R drive.

The Virtual CD-R system 20 arranged in the above-explained manner may be operated even under controls of the commercially available writing software in such a manner that the virtual CD-R drive of the present invention is properly interfaced with respect to the commercially-available writing software and is registered as a usable CD-ROM drive, while not only this Virtual CD-R system 20 can be operated in conjunction with the CD-Maker 11 equal to the CD-R writing software.

Virtual CDRD

Next, the Virtual CD-RD will now be explained. Among the two programs which constitute the Virtual CD-R system 20, the Virtual CD-RD may support such a basic structural portion which may be theoretically viewed completely equivalent to the actual CD-R drive when the virtual CD-R drive is viewed from the OS, whereas the virtual CD-R contains a drive panel function of a virtual CD-R drive and a mount/eject function of a CD. This drive panel function is necessarily required while CD-R drive hardware is operated by a user. This Virtual CD-R may support a function of various utilities/graphical user interface (GUI) which is provided to mainly use the Virtual CD-R system 20. Also, the Virtual CD-R may support the below-mentioned various operations: For instance, a blank CD is formed; a blank CD is mounted; a list is displayed as to a content of a Virtual CD, and a mounting condition; mounting/ejecting operations are indicated; contents of an actual CD is copied to a Virtual CD; while the CD-Maker 11 is called, contents of a Virtual CD disc are edited in conjunction with the CD-Maker 11; and a content is written into a Virtual CD-R disc, namely, an original Virtual CD is formed.

Operation of Actual CD-R Drive and Actual CD-R Disk

Figure 15:
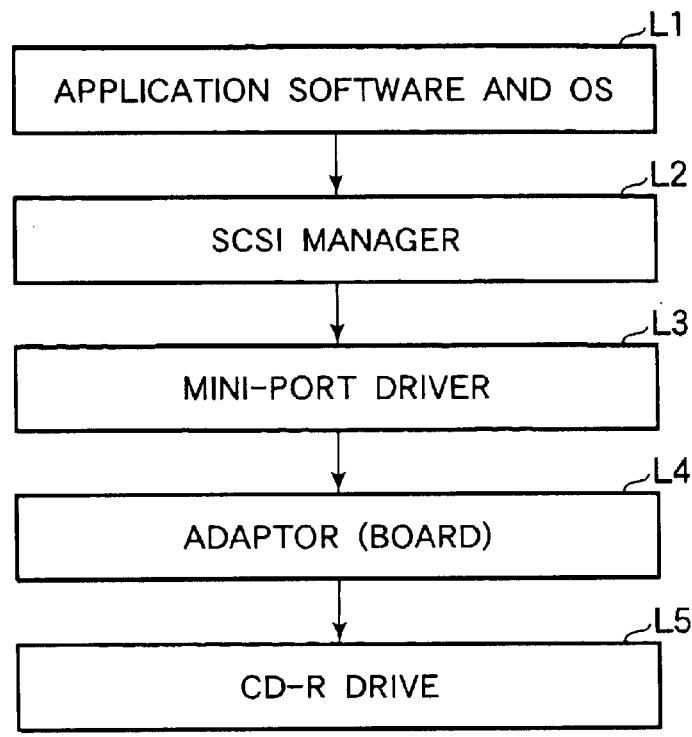
FIG. 15 is a flow chart for describing a CD-R drive control operation.
Figure 16:
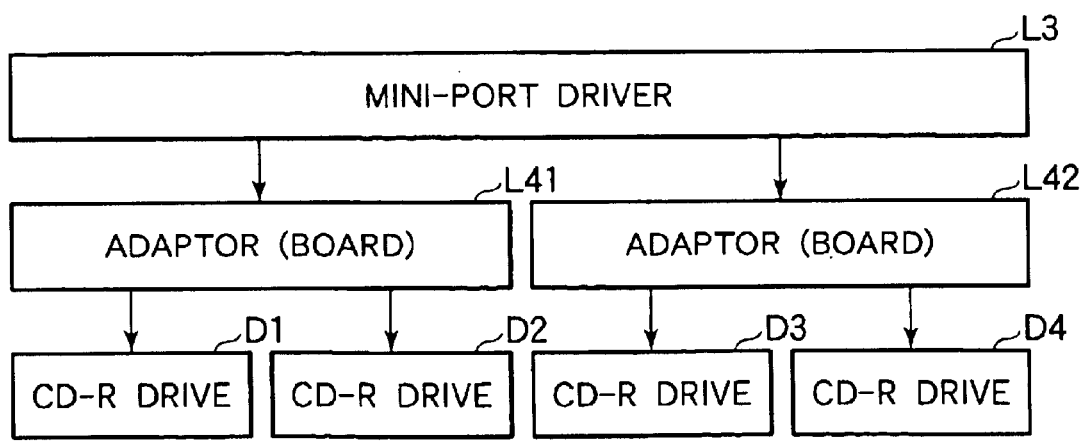
FIG. 16 is a block diagram for schematically representing a logical structural example of a virtual CD-R drive employed in the CD system.

In general, both an actual CD-R drive and an actual CD-R disc are operated under control of a system having a program structure as shown in FIG. 15. FIG. 15 is an example in the case that Windows 95/98 are used as the OS (operating system). In other words, application software and/or the OS (layer L1) will access via a SCSI (Small Computer System Interface) manager (layer L2) to a mini-port driver (layer L3) equal to a hardware driver located under a layer with respect to this layer L2. Also, the application software and/or the OS will access via an adaptor (layer L4) of an I/O interface board to a CD drive (layer L5). As previously explained, only the SCSI manager of the layer L2 is basically and directly viewed from the application software and the OS (layer L1). As a result, since the Virtual CD-RD program is installed into a program graded lower than the SCSI manager, the Virtual CD-R drive can be constituted, and the Virtual CD-R system 20 can be constituted in conjunction operation with the Virtual CD-R. In accordance with the present invention, this Virtual CD-R system 20 is realized by installing both a virtual adaptor and a virtual CD-R drive into the miniport driver of the layer L3 shown in FIG. 15. FIG. 16 represents a logical structure of the Virtual CD-R drive. FIG. 16 is an explanatory diagram for explaining an internal structure of the virtual CD-R drive. In this drawing, two sets of CD-R drives D1/D2 are connected to an adaptor L41, and also two sets of CD-R drives D3/D4 are connected to another adaptor L42. However, in an actual case, a preset number of virtual drives are formed.

With respect to the OS (operating system), since CD drives and the like connected to the adaptor are checked during the initialization operation, it is so assumed that the CD-R drives are connected at this time, so that the Virtual CD-R drive is recognized by the OS. Once the Virtual CD-R drive is recognized, the conditions of the CD drive itself and the information about the mounted virtual disc are received/transferred in response to the requests issued from the OS and the application software. The miniport driver portion plays such a role that a format of a command transferred from an upper-grade layer is converted into an internal representation which is supplied/received to/from the adaptor. Even when a plurality of virtual drives are provided, there is only one miniport driver. When a total number of these virtual drives exceeds seven drives as to one adaptor, plural sets of adaptor units are formed. However, the information as to a total number of these adaptors is merely changed with respect to the upper-grade layer, and all of these drives may become the same types of drives.

A plurality of CD-R drive units are formed, the total number of which is equal to a total number of virtual drives. Since discs mounted on the respective CD-R drive units and conditions thereof are different from each other with respect to each of the drives, the respective conditions are saved in the own program internal memories. Since a virtual drive has no operation panel, a virtual drive panel and a virtual mount window, which employ the function of the Virtual CD-R system, may be used as the operation panel means. In order to mount/eject a virtual disc on/from a virtual drive, and also to change a condition of a drive, several means may be employed, depending upon a purpose. One of these means is a specially provided vendor unique exclusively used command. The vendor unique exclusively-used command is installed in such a format that this exclusively-used command is received as a vendor definition unique command from the CD-R writing software. This exclusively-used command may be employed so as to mount/eject the virtual disc. To mount a virtual CD, another exclusively-used command is issued to a virtual drive, and this command may supply/receive information such as a status of a virtual CD to/from a virtual drive as a necessary parameter.

Mounting/Ejecting of Virtual CD on Virtual Drive

Figure 17:
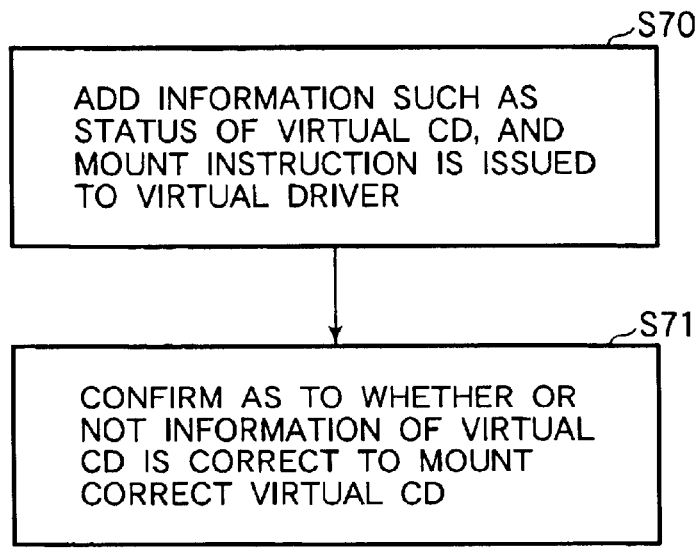
FIG. 17 is a flow chart for describing a mounting process example of a virtual CD employed in the CD system.

FIG. 17 is a flow chart for explaining a process flow operation in the case that a virtual CD is mounted on a virtual drive. That is, an instruction is issued to the virtual drive, while information such as a status of a virtual CD is added to this instruction (step S70). A confirmation is made as to whether or not the information of the virtual CD is correct, and the virtual CD is mounted on the virtual drive (step S71).

Figure 18:
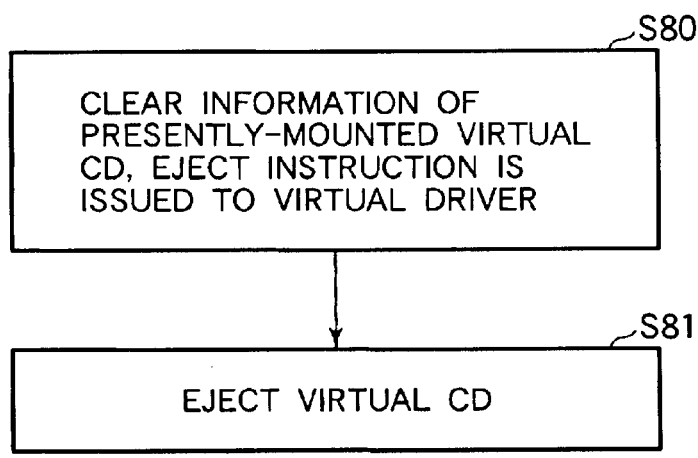
FIG. 18 is a flow chart for indicating an ejecting process example of the virtual CD.

Also, in order to eject a virtual CD from a virtual drive, another exclusively-used is issued to the virtual drive, while such a parameter capable of clearing the information of the presently mounted virtual CD is added to the exclusively-used command. FIG. 18 is a flow chart for describing a process operation in such a case that a virtual CD is ejected from a virtual drive. In other words, while information of the presently-mounted virtual CD is cleared, an instruction is issued to the virtual drive (step S80). Thereafter, the virtual CD is ejected (step S81).

Another method prepared so as to investigate a condition of a virtual drive may be realized by a shared memory of the entire Virtual CD-R system 20. Since the virtual drive reflects the internal state of the drive on a flag stored in the shared memory, the conditions of the virtual drive time to time may be checked from the Virtual CD-R system 20. In the shared memory, a status save memory is secured every virtual drive. This status save memory is employed in order to display on the virtual operation panel, such a fact as to whether or not the virtual CD mounted on the virtual drive is present, and also an access condition.

With employment of the above-explained logic structure/functions, the Virtual CD-RD is programmed in such a manner that while the OS, the application software, and the CD-R writing software are accessed via the SCSI interface, the Virtual CD-RD may be reacted and operated, like the actual CD-R is connected.

Virtual CD-R System 20

Figure 19:
FIG. 19 is a diagram for indicating an example of an icon registered in a system tray.

The Virtual CD-R system 20 is registered into the OS (operating system) when the CD-Master 10 is installed. Thereafter, every time the OS is operated, the operation of this Virtual CD-R system is automatically commenced, and such an icon indicated in FIG. 19 is registered in the system tray. The user interface of the Virtual CD-R system can be called by employing either the menu window of the CD-Master 10 or the icon of the continuously stayed portion which has been registered in the task tray.

Figure 20:
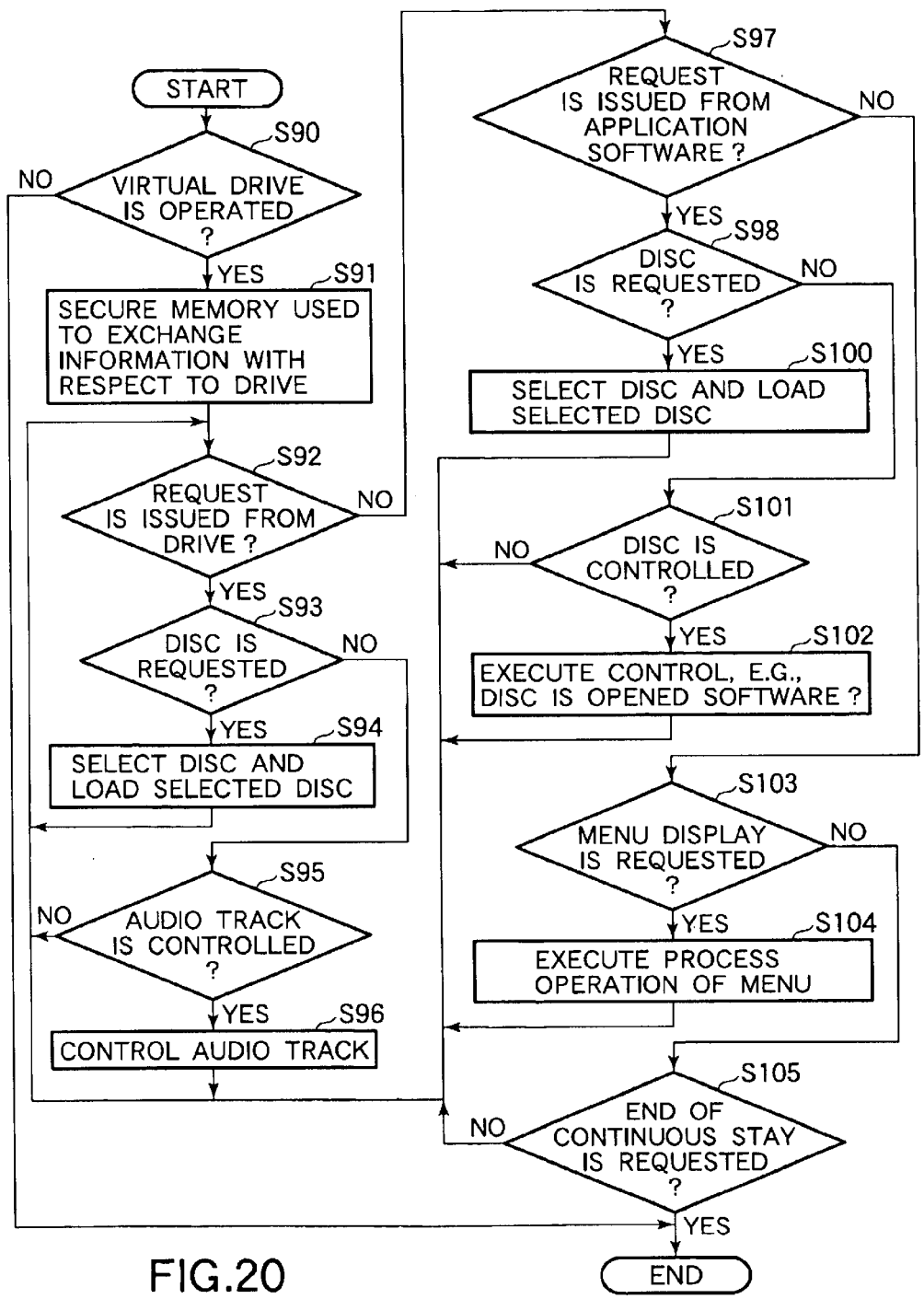
FIG. 20 is a flow chart for describing a basic operation example of a virtual CD-R system according to the present invention.

FIG. 20 represents a basic process operation (namely, virtual CD-R support unit) while the virtual CD-R system 20 is operated. When the operation of this Virtual CD-R system 20 is commenced in connection with the operation of the entire system, this Virtual CD-R system 20 continues its operation until the entire system is stopped, or the user issues the ending instruction. The roles of this Virtual CD-R system 20 are given as follows: While conditions of a virtual CD-R drive are monitored, this Virtual CD-R system 20 supports mounting/ejecting operation of a virtual CD-R disc, processing operation of a virtual CD-R disc, and furthermore reproducing operation of an audio track, if necessary. When the operation of the Virtual CD-R system 20 is commenced, a check is made as to whether or not the virtual CD-R drive is operated. When the virtual CD-R drive is not operated, an abend (abnormal end, or abort) message is displayed, and then, this basic process operation is ended. In the case that the virtual CD-R drive is operated, the virtual CD-R system 20 is still, continuously stayed, this Virtual CD-R system 20 continues the supporting operations while the Virtual CD-R system 20 periodically exchanges information with respect to the virtual CD-R drive.

In this basic process operation, a check is firstly made as to whether or not the virtual drive is operated (step S90). When the virtual drive is operated, a memory used to exchange information between this virtual drive and a drive is secured (step S91). A check is made as to whether or not a request is issued from the drive (step S92). When the request is issued from the drive, a check is made as to whether or not this request is to request a disc (step S93). If the disc request is issued, then a proper disc is selected to be loaded (step S94). Then, the process operation is returned to the above-described step S92. It should be understood that when the virtual drive is not operated at the step S90, this process operation is accomplished. When the disc is not requested at the step S93, a judgement is made as to whether or not an audio track is controlled (step S95). When it is so judged that the audio track is controlled, the Virtual CD-R system 20 controls the audio track, and then, the process operation is returned to the step S92 (step S96). Also, in such a case that the request is not issued from the drive at the step S92, a check is made as to whether or not a request is issued from the application software constructed based upon the automatic insertion setting operation of the virtual CD (step S97). If the request is issued from the application software, then a check is made as to whether or not a disc request is further issued (step S98). When such a disc request is issued, a proper disc is selected to be loaded, and then, the process operation is returned to the step S92 (step SI 00). Also, in the case that the disc request is not issued at the step S98, a judgement is made as to whether or not a disc control is requested (step S101). When it is so judged that the disc control is requested, the Virtual CD-R system 20 executes such a disc control operation, for example, a disc is opened. Then, the process operation is returned to the step S92 (step S102).

Furthermore, in the case that no request is issued from the application software at the step S97, a judgement is made as to whether or not a menu is requested (step S103). When such a menu request is issued, the Virtual CD-R system 20 performs the menu process operation, and then, the process operation is returned to the step S92 (step S104). When the menu display is not requested, a judgement is made as to whether or not ending of continuous stay of the Virtual CD-R system 20 is requested (step S105). If such an ending request is issued, then the process operation is completed. To the contrary, if such an ending request is not issued, then the process operation is returned to the step S92. It should also be noted that FIG. II indicates a window display screen (that is Japanese Version) of this menu.

Figure 21:
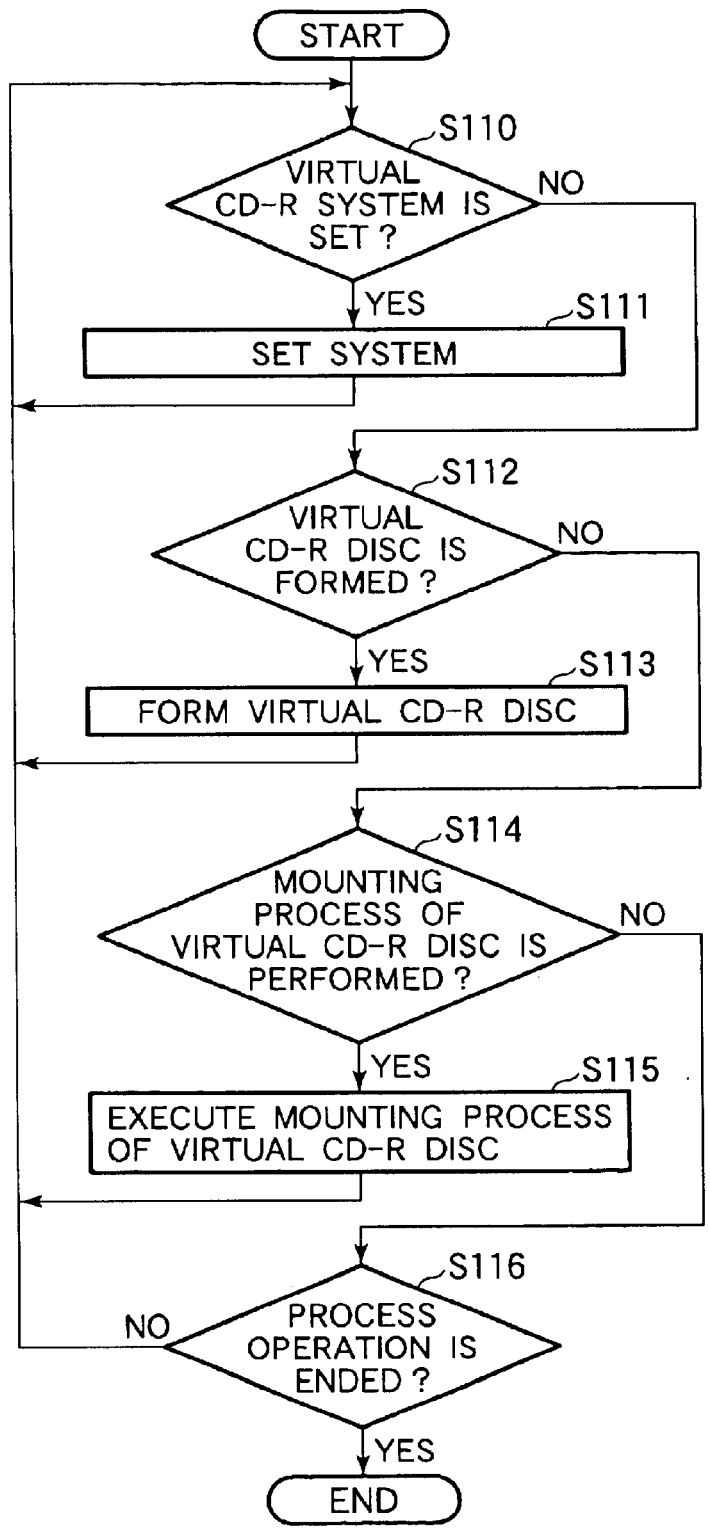
FIG. 21 is a flow chart for explaining an operation example of a menu processing unit of the virtual CD-R system.
Figure 22:
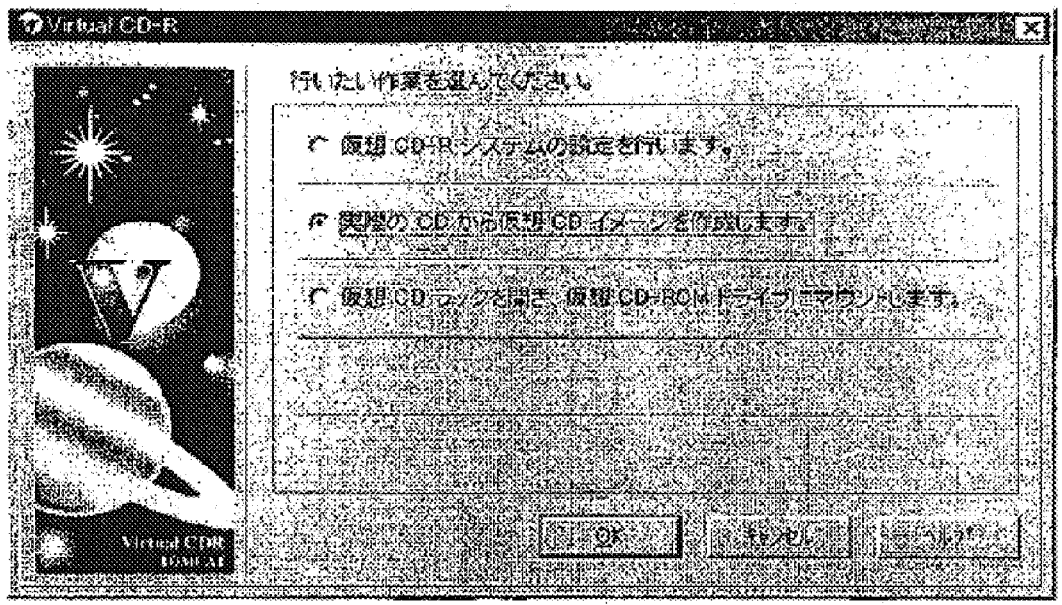
FIG. 22 is a display screen diagram for indicating an example of menus used in the virtual CD-R system.

FIG. 21 is a flow chart for explaining an example of a process operation executed by the menu processing unit employed in the Virtual CD-R system 20. A menu screen (that is Japanese Version) shown in FIG. 22 is indicated when the Virtual CD-R is called by the CD-Master 10. Since the Virtual CD-R has already been continuously-stayed, the CD-Master 10 instructs the Virtual CD-R system 20 which is continuously stayed so as to display a menu. From this menu, the following three functions may be called to be utilized from the functions owned by the Virtual CD-R system: (1) A total number of virtual drives is set, and a storage capacity of remaining discs which are not used as the virtual CDs is set. (2) A content of an actual CD is duplicated to a virtual CD. (3) Virtual CDs are managed and are mounted/ejected on/from virtual drives.

Figure 23:
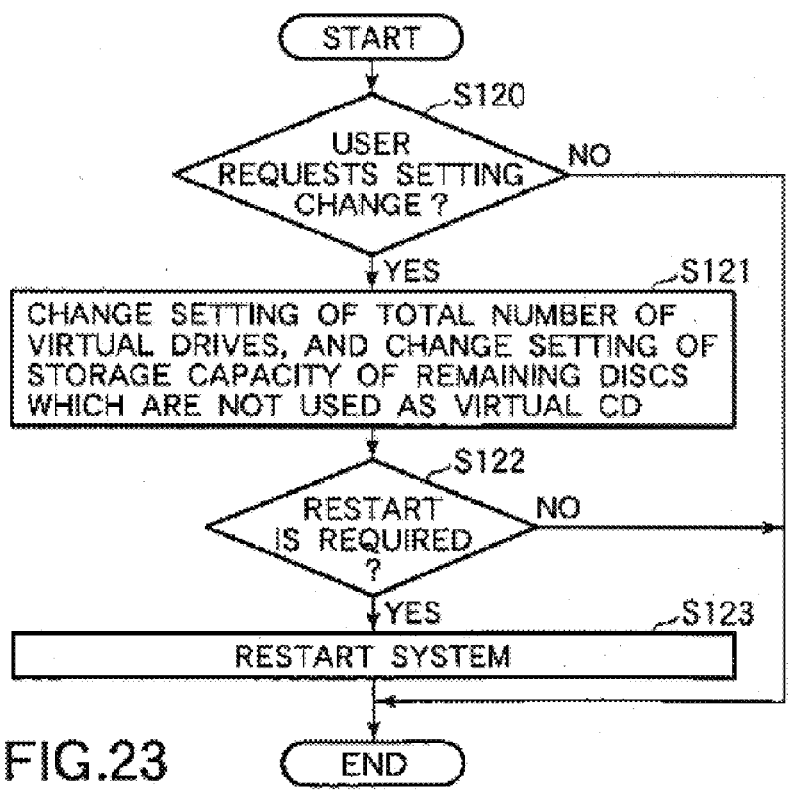
FIG. 23 is a flow chart for indicating an operation example of a setting unit employed in the virtual CD-R system.
Figure 24:
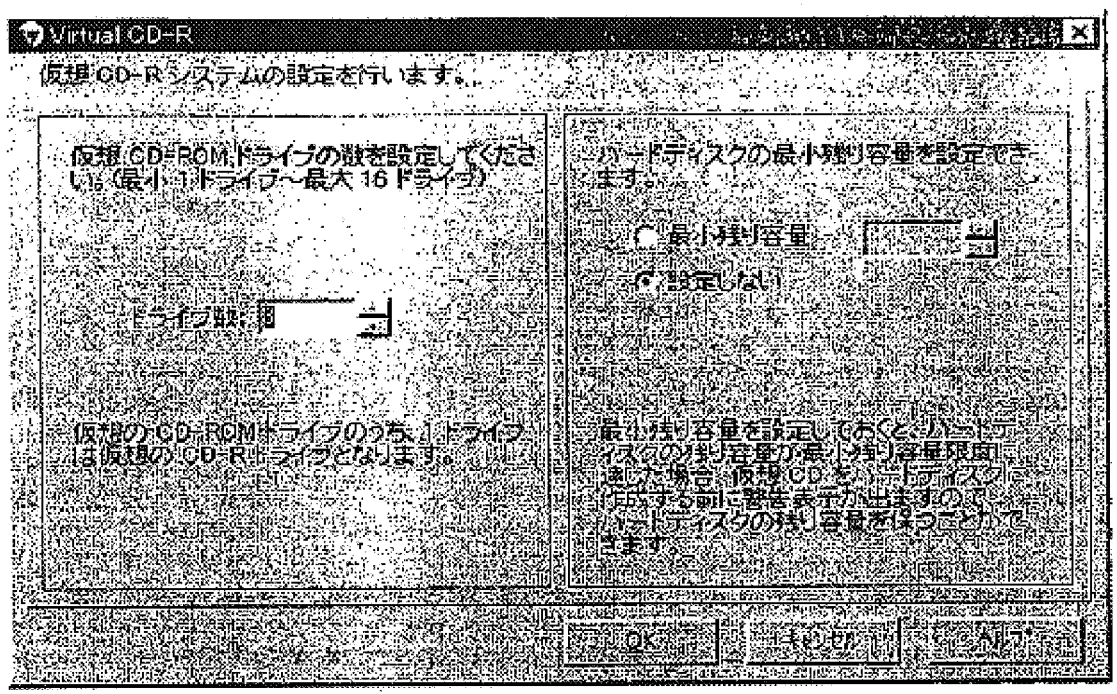
FIG. 24 is a display screen example for indicating an example of a system setting window.

Referring now to a flow chart of FIG. 21, a judgement is made as to whether or not a virtual CD-R system is set (step S110). If "YES", then this virtual CD-R system is set, and the process operation is returned to the above step S110 (step S111). In the case that the virtual CD-R system is not set at the step S110, a check is made as to whether or not a virtual CD-R disc is formed (step S112). If "YES", then the virtual CD-R disc is formed, and the process operation is returned to the above-step S110 (step S113). Also, in the case that the virtual CD-R disc is not formed at the step S112, another check is made as to whether or not the virtual CD-R disc is mount-processed (step S114). When the virtual CD-R disc is mount-processed, this mount-processed operation of the virtual CD-R disc is carried out, and then the process operation is returned to the above step S110 (step S115). When the virtual CD-R disc is not mount-processed at the step S114, a check is made as to whether or not the process operation is ended (step S116). If "NO", then the above-explained process operation is repeatedly carried out until the process operation is ended. FIG. 23 is a flow chart for describing a process operation executed by the setting unit of the Virtual CD-R system 20. The values set to the window are registered as setting of the software of the Virtual CD-R and the system information of the OS, and are used to restart the computer, if need. In other words, a check is made as to whether or not the user changes the set values (step S120). When the user changes the set values, setting of the total amount of the virtual drives is changed, and further setting of the storage capacity of the remaining discs which are not used as the virtual CD is set (step S121). A check is made as to whether or not the computer is required to be restarted (step S122). If "YES", then the computer is restarted and the process operation is ended (step S123). A setting display screen (that is Japanese Version) of the Virtual CD-R system 20 is indicated in FIG. 24.

Duplication from Actual CD Virtual CD

Figure 25:
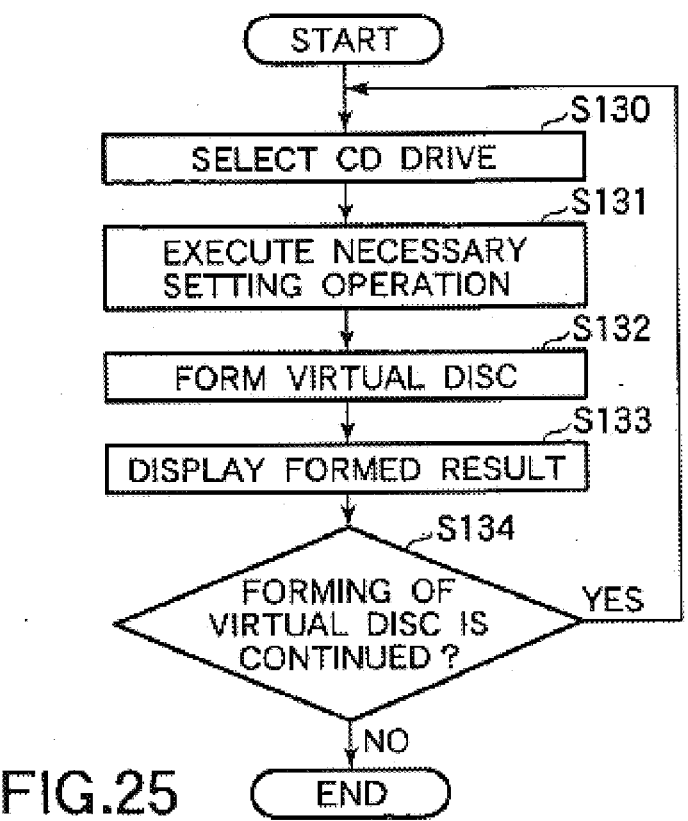
FIG. 25 is a flow chart for explaining a process operation example of a duplication function executed from an actual CD to a virtual CD in the CD system.
Figure 26:
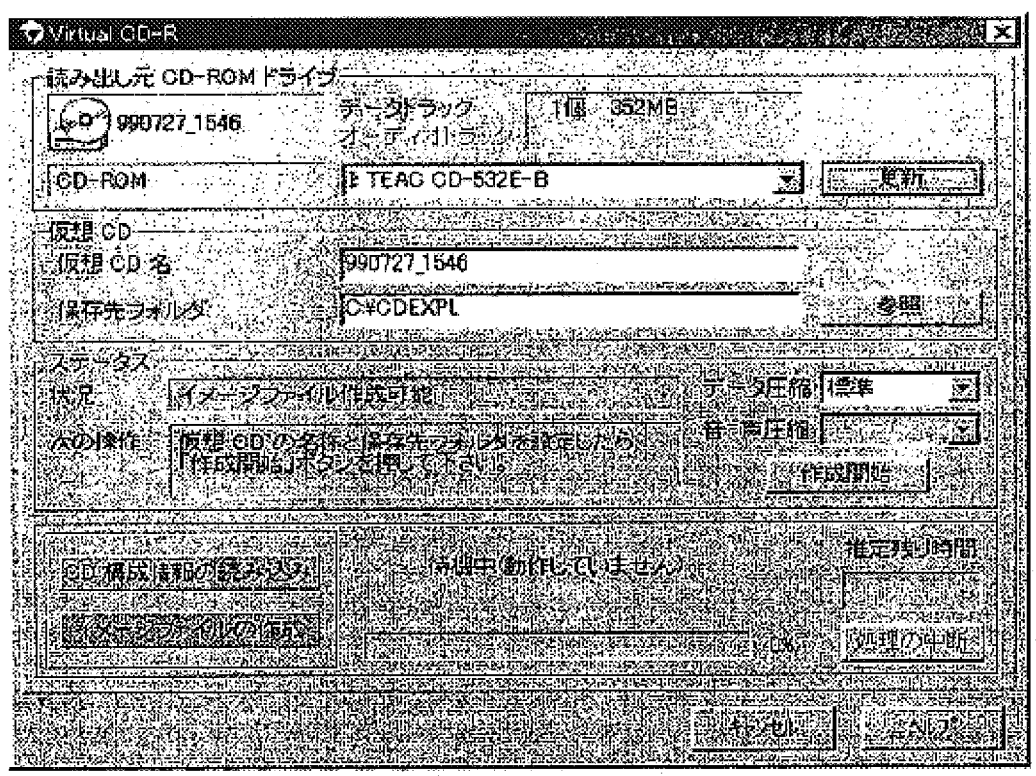
FIG. 26 is a display screen example for showing an example of a window screen of the duplication function executed from the actual CD to the virtual CD.

FIG. 25 is a flow chart for explaining an example of a process operation required in the case that the Virtual CD-R system 20 duplicates a content of an actual CD into a virtual CD. First, when a selection is made of such a drive into which an actual disc functioning as a read source has been mounted (step S130), structural information of the inserted CD is investigated. Then, in the case that the user performs a predetermined setting operation, and instructs to commence forming of an image file (step S131), the image file of the virtual CD is formed (step S132). In this setting operation, a name is applied to a virtual CD-R disc, namely, the user sets such that the virtual CD-R disc is saved in which folder of which storage apparatus. Thereafter, a result of the formed image file is indicated (step S133). Then, the virtual disc is repeatedly formed until the process operation is ended (step S134). FIG. 26 indicates a display screen (that is Japanese Version) of the duplication function to the virtual CD.

Figure 27:
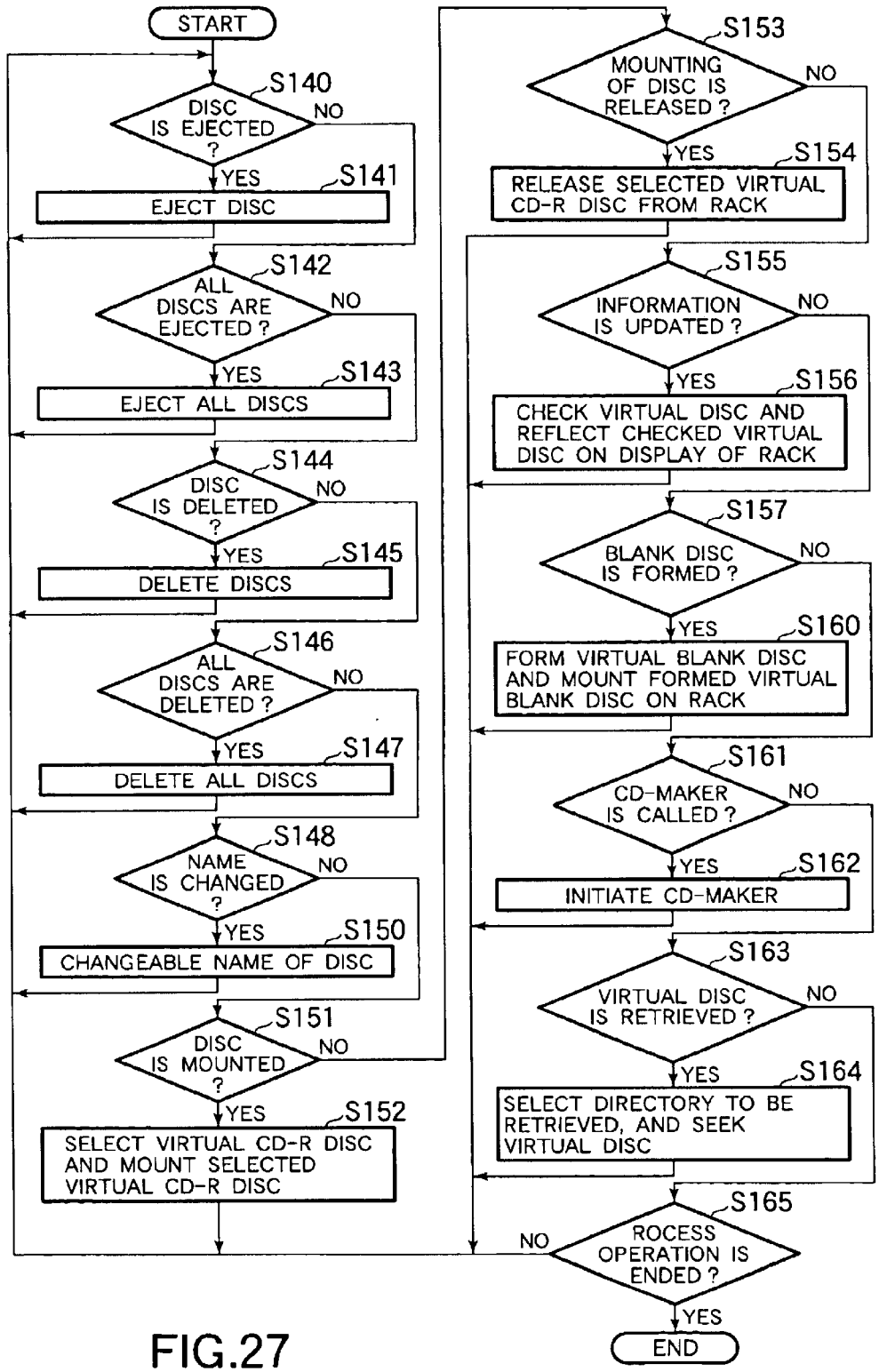
FIG. 27 is a flow chart for explaining an operation example of a mounting process unit of a virtual CD.
Figure 28:
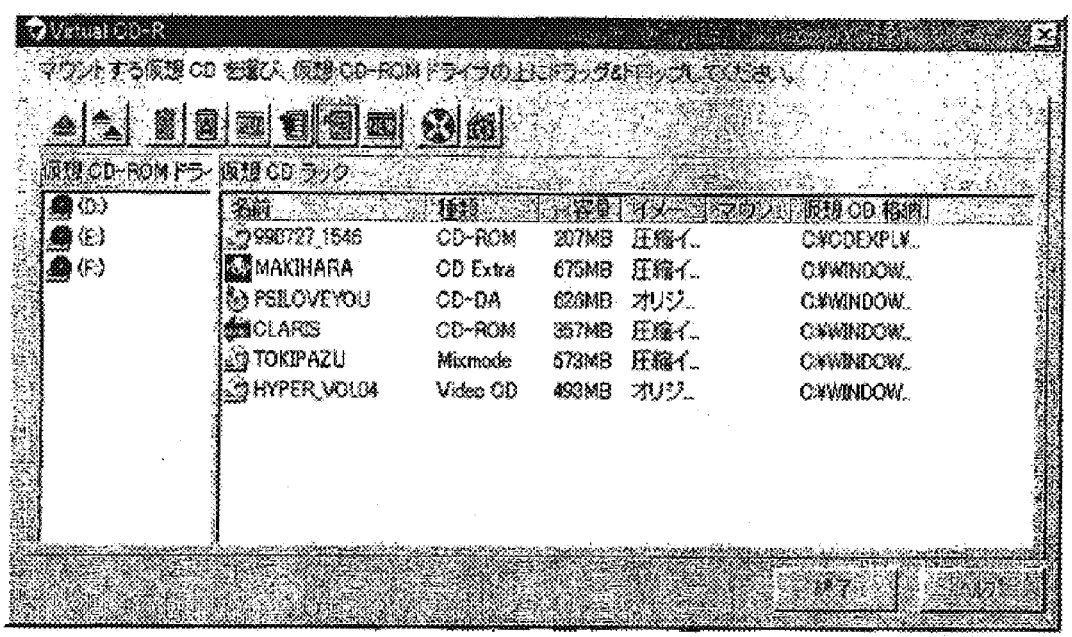
FIG. 28 is a diagram for showing an example of a window screen of the mounting process unit.

FIG. 27 is a flow chart for explaining a functional example used to manage the virtual CDs in the Virtual CD-R system 20. The respective functions used to manage the virtual CDs are called by manipulating function buttons provided on an upper portion of a mount processing unit shown in the window (that is Japanese Version) of FIG. 28. The window is closed by manipulating an end button.

Next, a description will now be made of a user interface emulation function of CD-R drives employed in the Virtual CD-R system 20. When the Virtual CD-RD is installed, it may be seen from the OS that a SCSI adaptor is added. The Virtual CD-R system 20 recognizes a virtual drive by sending a response with respect to an interrogation issued from the OS for this SCSI adaptor in such a manner that the CD-R drive is connected to the SCSI bus. Both the OS and the general-purpose application software may access the virtual drive, while using the same API (Application Programming Interface) command and the same SCSI command as those used with respect to the normal drive. Since the virtual drive is managed under ASPI (Advanced SCSI Programming Interface), another control with employment of the ASPI may be carried out. While the virtual drive is handled by using these API and ASPI, there is no clear discrimination except for the response speeds in the case that the actual drive is handled. The virtual drive as viewed from the user owns two major different points, as compared with the actual drive. As the first different point, the virtual disc must be inserted into the virtual drive. Since the virtual disc is present in the form of a file saved in an HDD and the like, this virtual disc cannot be handled by the hand of the user. As the second major different point, a headphone jack is not provided. As previously explained, since the virtual drive is not equipped with the headphone jack, a substitution appliance must be prepared when the user listens to music.

Mounting of Virtual CD

Referring now to a flow chart shown in FIG. 27, operations of the mounting process operation for the virtual CD will be described. A first confirmation is made of a disc ejection (step S140), and a disc mounted in the selected drive is ejected, and then, the process operation is returned to the above-step S140 (step S141). To the contrary, in the case that the disc ejection is not instructed, a judgement is made as to whether or not all of the discs are ejected (step S142). If "YES", then all of the discs are ejected and the process operation is returned to the above-explained step S140 (step S143). Also, in the case that all of the discs are not ejected at the step S142, a judgement is made as to whether or not the selected disc is deleted (step S144). If "YES", then the selected disc is deleted and the process operation is returned to the step S140 (step S145). To the contrary, in such a case that the selected disc is not deleted, a check is made as to whether or not all of the discs are deleted (step S146). If "YES", then all of the discs are deleted, and the process operation is returned to the above step S140. In the case that all of the discs are not deleted at the above step S146, a judgment is made as to whether or not a name of a disc can be changed (step S148). If "YES", then the name of the disc can be changed, and the process operation is returned to the above step S140 (step S150). Furthermore, in the case that the name of the disc is not changed at the step S148, a check is made as to whether or not a disc is mounted (step S151). If "YES", then a virtual CD-R disc to be mounted on a rack is selected, and the selected virtual CD-R disc is mounted, and thereafter, the process operation is returned to the above-step S140 (step S152).

Also, in the case that the virtual CD-R disc is not mounted on the rack at the step S151, another judgment is made as to whether or not mounting of the virtual CD-R disc is released (step S153). When mounting of the virtual CD-R disc is released, the selected virtual CD-R disc is dismounted from the rack, and then the process operation is returned to the above-described step S140 (step S154). In the case that mounting of the disc is not released at the step S153, a judgment is made as to whether or not the information is updated (step S155). If the information is updated, then the virtual disc is investigated and the investigated virtual disc is reflected on the display of the rack, and the process operation is returned to the above step S140 (step S156). In the case that the information is not updated at the step S155, a judgment is made as to whether or not a blank disc is formed (step S157). If "YES", then a virtual blank disc is formed, and the formed virtual blank disc is mounted on the rack, and the process operation is returned to the above step S140 (step S160). To the contrary, in the case that the virtual blank disc is not formed at the step S157, a judgment is made as to whether or not the CD-Maker 11 is called (step S161). If "YES", then the CD-Maker 11 is started up in such a mode suitable for the selection condition, and the process operation is returned to the above step S140 (step S162). To the contrary, when the CD-Maker 11 is not called at the step S161, a check is made as to whether or not a virtual disc is retrieved (step S163). If "YES", then a directory to be retrieved is selected, and the virtual disc is sought, and the process operation is returned to the step S140 (step S164). In the case that the virtual disc is not retrieved at the step S163, a judgment is made as to whether or not the process operation is ended (step S165). If "NO", then a series of the above-explained process operations are repeatedly carried out until the process operation is ended.

Operation of Virtual CDRD

Figure 29:
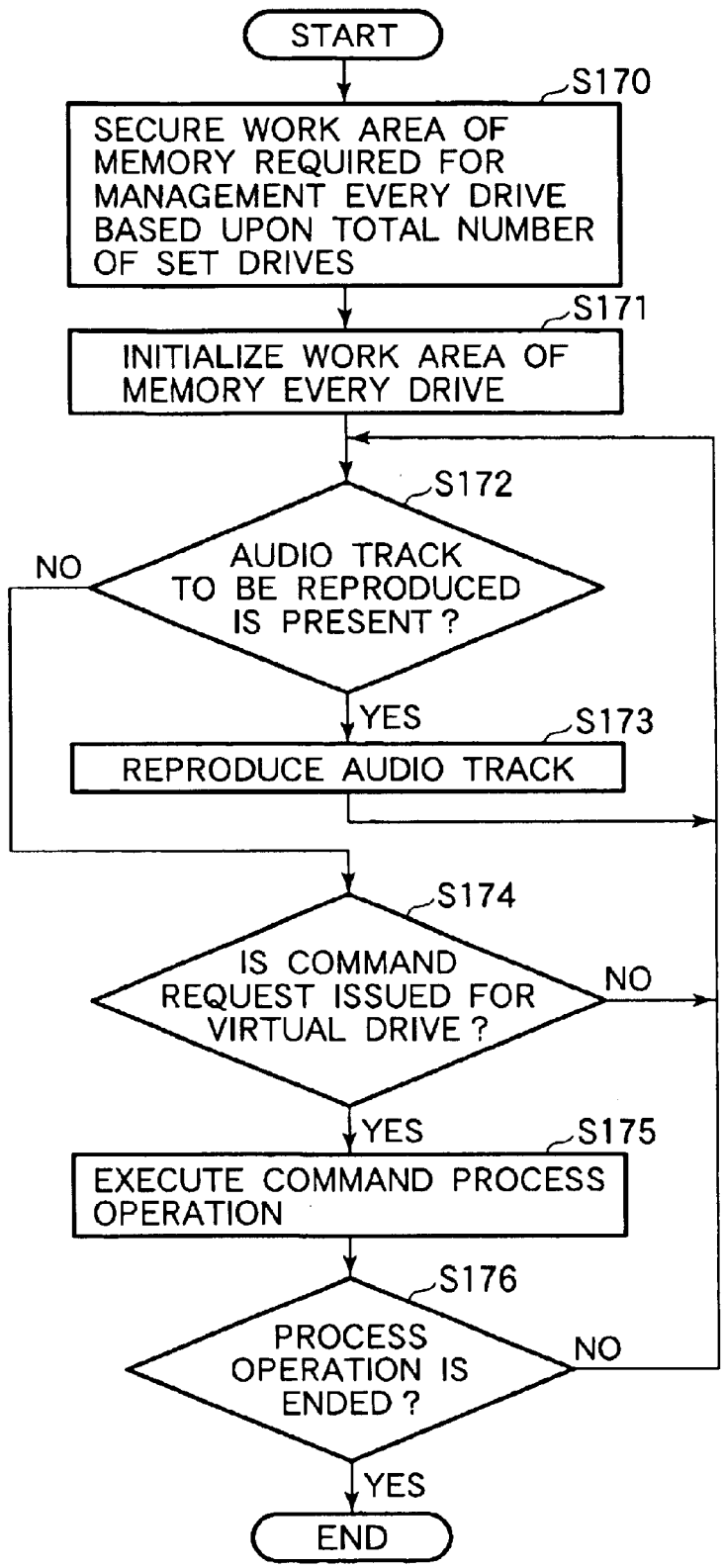
FIG. 29 is a flow chart for representing an operation example of a Virtual CDRD.

FIG. 29 is a flow chart for explaining an example of operations of the Virtual CD-RD. When a computer starts to operate, the virtual drive commences its operation at the same time. When the computer accomplishes its operation, this virtual drive accomplishes its operation. The commands of the virtual drive may support approximately 40 sorts of commands including an exclusively-used command used to control the virtual drive, while using the multi-media command defined in the SCSI-3 as a basic command. As a vendor unique command, the exclusively-used command is employed so as to mount/eject a virtual CD with respect to such a virtual drive having no drive panel, and also in order that an audio track is reproduced by such a virtual drive having no audio output.

In other words, as indicated in the flow chart of FIG. 29, a work area of a memory is secured (step S170). This work area is required so as to execute a management every drive in accordance with the preset drive number. The work area of the memory is initialized with respect to each of the drives (step S171). Then, a judgment is made as to whether or not an audio track to be reproduced is present (step S172). If "YES", then this audio track is reproduced and the process operation is returned to the above step S172 (step 173). To the contrary, in such a case that such an audio track to be reproduced is not present at the step S172, a judgment is made as to whether or not a command is requested with respect to the virtual drive (step S174). If "YES", then this command is processed (step S175). A judgment is made as to whether or not the process operation is ended (step S176). It should also be noted that when no command request is issued at the above step S174, if the process operation is not ended at the step S176, then the process operation is returned to the previous step S172.

Structures of Virtual CD-R/Virtual CD

Next, a description will now be made of a structure of a Virtual CD-R used as a media of the Virtual CD-R system 20. A virtual CD is constituted by "DISCINFO.TVC" corresponding to the own information file, and several files, if required. Normally, the virtual CD occupies such a directory having the same name as that of the virtual CD. The name of the virtual CD is recorded in "DISCINFO.TVC" which constitutes the virtual CD. Even when the virtual CD is moved to another directory having a different name from the above-described name. As a result, even under such an environment that the character which is used in the name of the virtual CD cannot be used as the name of the directory, the virtual CD can be formed. Now, a description will be made of a structure of a virtual CD, for example, while a name of a directory where the virtual CD is formed is defined as "C:δCDEXPL", and a name of a virtual CD to be formed is defined as "TOMCATCD."

Figures 30, 31, 32:
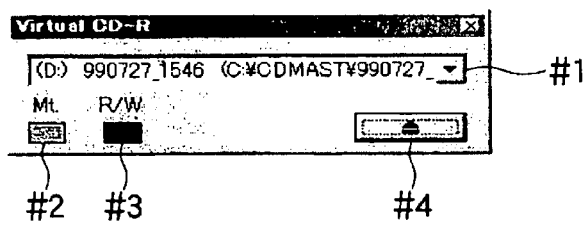
FIG. 30 is a diagram for representing a structural example of a virtual CD.
FIG. 31 is a diagram for representing a structural example of DISCINFO.TVC for constituting a virtual CD.
FIG. 32 is a diagram for indicating an example of a virtual drive panel.

FIG. 30 is a diagram for illustrating files which constitute a virtual CD and an arrangement of these files as to an actual example of the virtual CD. Symbol "DISCINFO.TVC" indicates a file which constitutes a center of this virtual CD. Into this file, the entire structural information of the virtual CD is recorded, and when a data track is contained in the virtual CD, the content of this data track is recorded into this file. Symbol "DISCINFO. ICO" corresponds to a mount window of the Virtual CD-R system 20, and is an icon file used to express the virtual CD. Three sets of files "TRACK01.WAV", "TRACK02.WAV", and "TRACK03.WAV" correspond to an image of an audio track contained in the virtual CD.

FIG. 31 is an explanatory diagram for explaining the structure of the file "DISCINFO.TVC." This file "DISCINFO.TVC" is mainly subdivided into a header portion and a data portion. A data size of the header portion is equal to 4,096 bytes. In such a case that such a disc containing a data track as a blank CD and an audio CD is used, since only the header portion is recorded in this file "DISCINFO.TVC", a size of a file is identical to size of the header portion. With respect to a mode/format type of a CD, a session number thereof, a track number thereof when the CD disc is formed, as to each of 99 tracks in maximum, various information is recorded on the header portion. The various information is related to a format of a track, a starting position thereof, a length of the track, and a size of a block.

Symbol "DISCINFO. ICO" indicates an icon displayed when this disc is viewed by the mount window of the Virtual CD-R system 20. When this file is not present, such an icon of a default is displayed in correspondence with the structure of the virtual CD.

The Wave file such as "TRACK01.WAV" corresponds to a file formed every track in the case that an audio track is contained in the relevant disc. Normally, plural sets of files are formed whose number is equal to a total music number of an original actual CD. This Wave file corresponds to such a file utilized when a virtual CD is reproduced by using software (CD player) employed in a computer. This file may be utilized by way of such application software capable of reproducing the normal wave file.

Graphical User Interfaces of Virtual Drive/Virtual CD

Next, a graphical user interface (GUI).of a virtual drive and a graphical user interface of a virtual CD will now be explained. The Virtual CD-R system 20 owns a function capable of forming a virtual CD from an actual CD, and mounts the virtual CD on the virtual drive with employment of a virtual drive panel function.

An operation panel of a virtual drive by a virtual drive panel is represented in FIG. 32 by double-clicking the icon of the Virtual CD-R system indicated on the task tray when the CD-Master 10 is installed. In this drawing, symbol "#1" shows a drive switching button; symbol "#2" indicates a disc condition confirming lamp; symbol "#3" represents an operation confirming lamp; and symbol "#4" shows a disc exchanging button. While 16 sets of virtual drives may be formed in maximum, there is only one virtual drive panel. How the virtual drive panel corresponds to which virtual drive may be realized by selecting a proper virtual drive from a list of the virtual drives which appear when the drive switching button #1 is depressed. When the corresponding virtual drive is selected, the virtual drive panel indicates the information of the selected virtual drive. When a disc is mounted on a drive, the information of the mounted disc is displayed, and the disc condition confirming lamp (virtual lamp) of "Mt." of the symbol "#2" is turned in a green color. When a drive is accessed by the application software, the operation confirming lamp (virtual lamp) of "R/W" of symbol "#3" is turned into either a green color or an orange color. In the case that a virtual CD is replaced by another virtual CD, the disc exchanging button (virtual eject button) of symbol "#4" is clicked so as to once eject the presently mounted disc. When this disc exchanging button is once clicked, the disc selection window is displayed. Alternatively, while a proper directory of a virtual CD is selected by utilizing software such as Explorer, the selected directory may be dragged and dropped with respect to the virtual drive panel.

Figure 33:
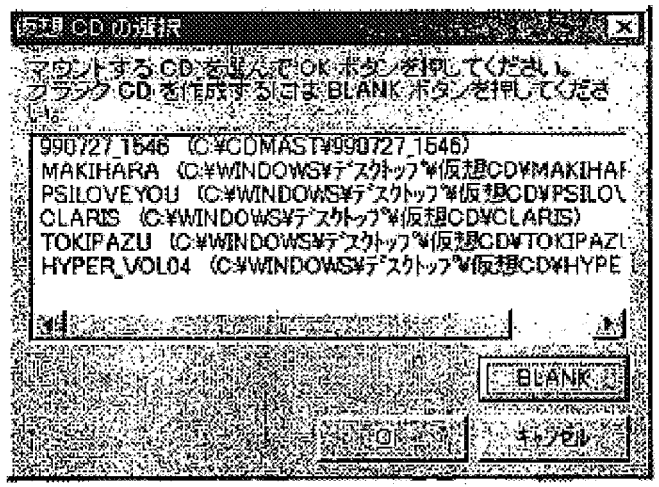
FIG. 33 is a display screen diagram for indicating an example of a selection window of a virtual CD.

FIG. 33 is a display screen (that is Japanese Version) of a disc selection window displayed when a disc mounted on a virtual drive is selected. When a virtual CD which is mounted on a virtual drive is selected and then the OK button is depressed, the selected virtual CD is mounted on the virtual drive. In the case that a new virtual CD is written, when a BLANK button is depressed, a blank virtual CD is formed, and then the formed blank virtual CD is mounted on the virtual drive. It should also be noted that since only one first-formed virtual drive may be written into the virtual CD-R in the embodiment of the present invention, the depression of the BLANK button is not made effective while the drives subsequent to the secondly-formed drive are handled. Although a target virtual CD is present, in the case that and a target virtual CD has not yet been registered into the list contained in the window, this target virtual CD may be added to the list in such a manner that the directory of the virtual CD is selected by using the software such as Explorer, and then this selected directory is dragged and dropped on this list. The selection window of the virtual CD may also be displayed when the virtual CD is mounted by using such application software capable of mounting/ejecting the virtual CD in addition to such a fact that the selection window of the virtual CD is called from the virtual drive panel to be displayed. For instance, while a virtual drive is selected by a CD player, even if the eject button is depressed when the disc is mounted, the selected window of the virtual CD is displayed, and then the disc may be selected. In this alternative case, the disc mounting request issued from the application software is transferred to the virtual drive, and furthermore, this disc mounting request is sent to the Virtual CD-R system 20 which monitors the virtual drive, so that the Virtual CD-R system 20 displays the selected window of the virtual CD. When the virtual CD is selected since this Virtual CD-R system 20 mounts the selected CD on the virtual drive, the application software which requests the disc can satisfy the requirement.

Other Process Operation

Figure 34:
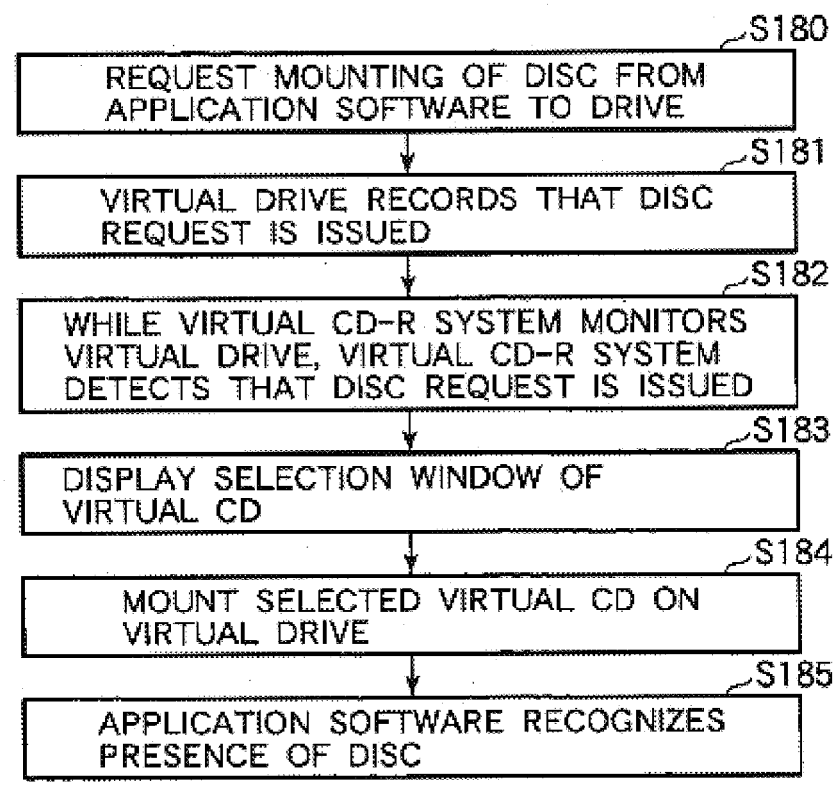
FIG. 34 is a flow chart for explaining a mounting process example of a disc by application software.

FIG. 34 is a flow chart for describing an example of a process operation executed in the case that application software which does not belong to the CD-Master 10 requests the CD with respect to the virtual drive. While a new function is added to the application software, such a request which is issued by the function normally equipped with the application software may realize a target operation by cooperating the relevant application software with the virtual drive. That is, in this flow chart, the application software which does not belong to the CD-Master 10 requests the drive to mount the disc (step S180). The virtual drive records thereon the request of the disc (step S181). While the Virtual CD-R system 20 monitors the virtual drive, this Virtual CD-R system 20 detects such a fact that the disc request is issued (step S182). Then, the selected window of the virtual CD is displayed (step S183), and then, the selected virtual CD is mounted on the virtual drive (step S184), and the application software recognizes the presence of the disc (step S5185).

Subsequently, conjunction operations (co-operations) executed in the CD-Master 10 will now be explained. The conjunction operations are carried out among the application software related to the CD-Master 10 as follows: The system is shut down; the system is restarted; the Virtual CD-R system is ended; the Virtual CD-R system is not displayed; the Virtual CD-R system is brought into the waiting state; the Virtual CD-R system is displayed; the blank virtual CD-R disc is formed/mounted; the blank virtual CD-R disc is mounted; the virtual CD is mounted; the closed virtual CD disc is opened; and the virtual CD is deleted. When the virtual drive is used as a subject and the disc is loaded by the CD-Maker 11, the blank disc is automatically formed and load. In this case, the CD-Maker 11 may designate a place where the virtual CD is formed, and a name of this virtual CD.

Figure 35:
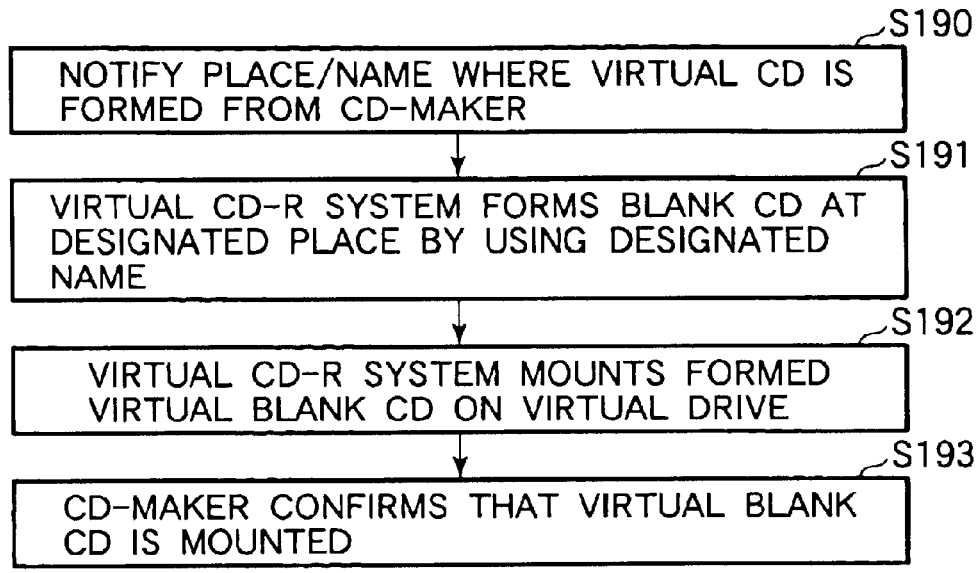
FIG. 35 is a flow chart for explaining an example of a process operation for forming a blank CD designated by a name.

FIG. 35 is a flow chart for explaining an example of a process operation executed when a blank virtual CD is required. In other words, both a place where the virtual CD is formed and a name of this virtual CD are firstly notified from the CD-Maker 11 (step S190). Then, the Virtual CD-R system 20 forms a blank CD at the designated place and having the designated name (step S191). The Virtual CD-R system 20 mounts the formed virtual blank CD on the virtual drive (step S192), and the CD-Maker 11 confirms such a fact that the virtual blank CD is mounted, and then the process operation is ended (step S193). Although an actual CD cannot be technically rewritten, a virtual CD-R can be technically rewritten. As a result, the closed CD is returned to the open state, and the additional information may be written into this CD under open state.

Figure 36:
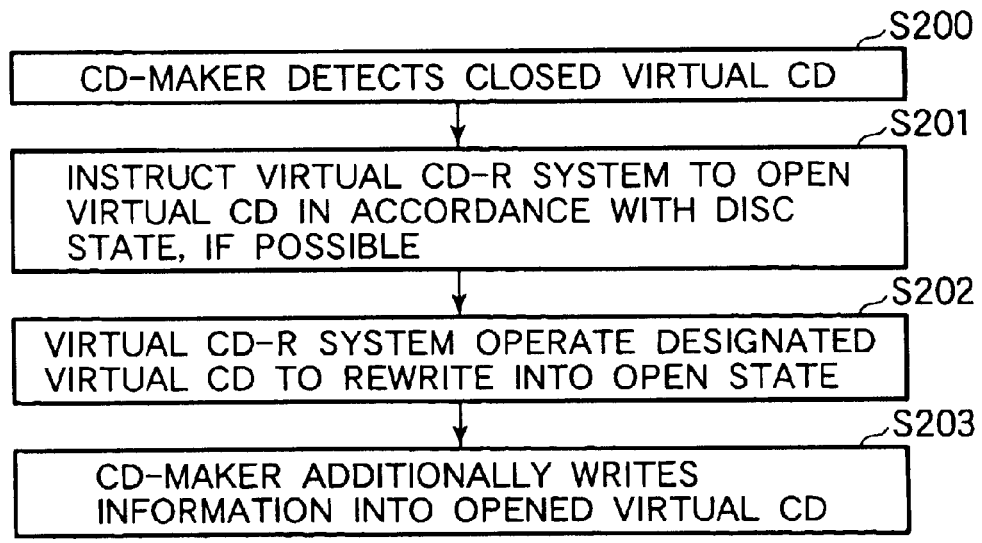
FIG. 36 is a flow chart for describing an example of an opening sequence of the virtual CD.
Figure 37:
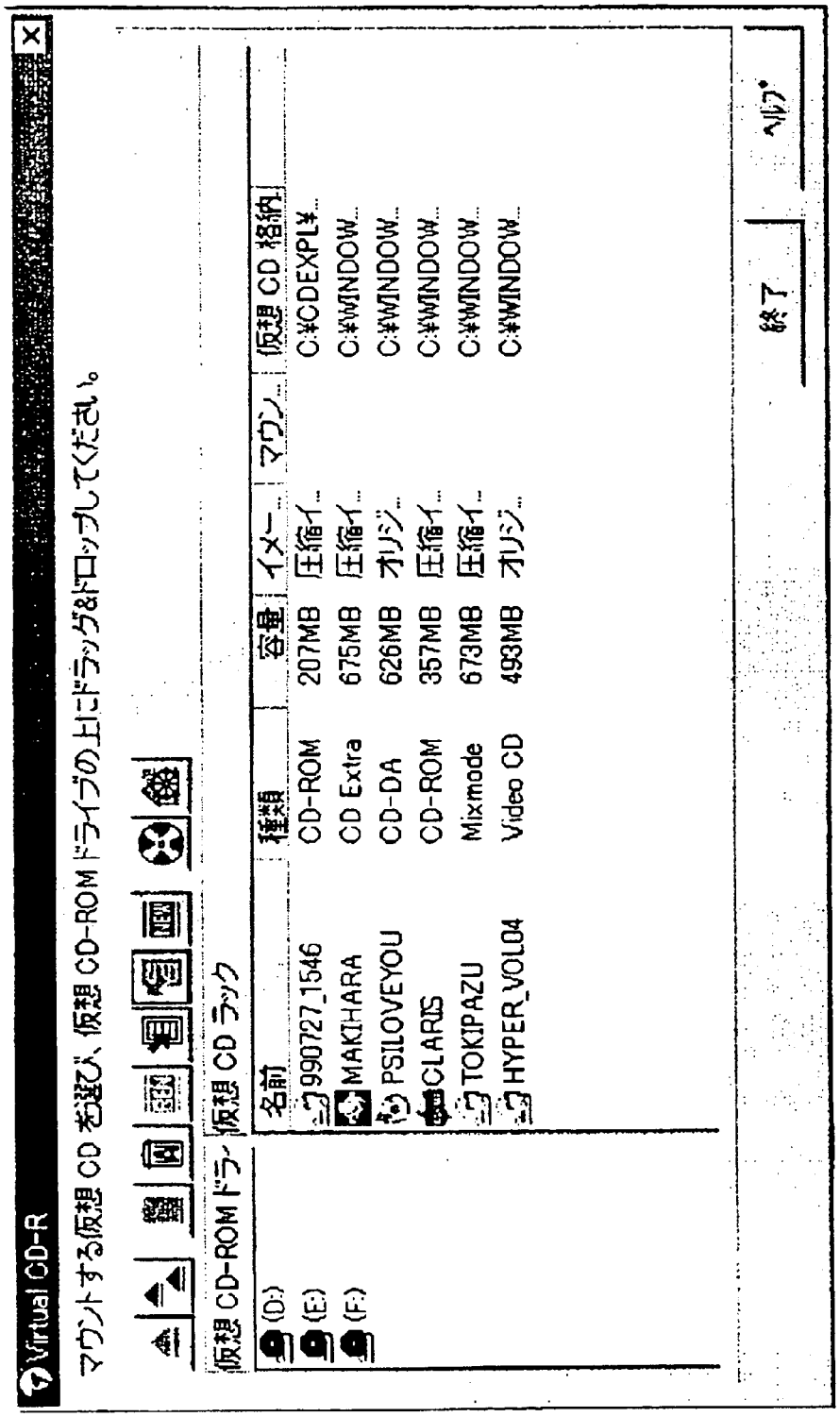
FIG. 37 is a display screen for representing a display example of a mounting window employed in the virtual CD-R system.

FIG. 36 is a flow chart for describing an example of a process operation performed in the case that the CD-Maker 11 opens the virtual CD. That is to say, the CD-Maker 11 firstly detects the closed virtual CD (step S200), and may instruct the Virtual CD-R system 20 to open the detected virtual CD, if possible, depending upon the disc condition of the detected virtual CD (step S201). Then, the Virtual CD-R system 20 operates the designated virtual CD to rewrite this virtual CD into the open condition (step S202). The CD-Maker 11 additionally writes the information into the opened virtual CD (step S203). In the mount window of the Virtual CD-R system 20, the content of the selected virtual CD may be edited, and also the CD-Maker 11 may be called in order to additionally write the information into the mounted virtual CD. In this case, the Virtual CD-R system 20 can easily utilize the CD-Maker 11 by additionally writing the following information into the CD-Maker 11 so as to establish the relationship. This information is related to an address of a virtual drive on which an original virtual CD is mounted, and also another address of a virtual drive on which a virtual CD to be written is mounted. A display (that is Japanese Version) of this mount window is illustrated in FIG. 37.

As previously described, in accordance with the CD system of the present invention, the content of the CD can be written from the writing software CD-Maker into the virtual CD-R, and the formed virtual CD can be reproduced, checked, and confirmed before the actual CD is formed from this virtual CD. The actual CD can be quickly manufactured without any loss. Also, since the CD-Maker can be operated even in such a system having no CD-R drive, the CD forming work can be shared by a notebook type personal computer, the writing speed into the virtual CD-R disc becomes 16 to 50 times higher than the normal writing speed of the actual CD. As a result, the master CD (namely virtual CD) can be formed at such a high speed which can be hardly expected in the actual CD. Also, the virtual CD which has been formed for the test purpose by the CD-Maker, or the virtual CD whose content has been edited in an original desirable taste can be converted into the actual CDs which may be distributed. Furthermore, since the formed actual CDs are converted into the virtual CDs and then the virtual CDs are grouped/stored, the deterioration of these formed actual CDs can be avoided and also can be retrieved in very high speeds. Thus, the CD data can be commonly used, and while the actual CDs are formed in the form of the virtual CDs, these virtual CDs can be saved in all of the below-mentioned rewritable media MD (opto-magnetic disk), PD (private disc), ZIP (namely, one sort of removable disk (floppy disk) employed in MAC system), HDD, and networks. As a consequence, these virtual CDs may be reproduced as actual CDs any time, if necessary. When a virtual CD-R is employed, such a work may be continued. That is, such a CD that sessions are once prohibited to be closed and be additionally written is brought into a session-provisional-open state, and thus, this virtual CD-R may be used as an additionally rewritable CD.

In the case of an actual CD-R disc, a CD having a storage capacity which exceeds the normal writable storage capacity (namely, 650 MB) of the actual CD-R disc cannot be copied, but also cannot be formed. However, in the virtual CD-R system of the present invention, any commercially-available CDs whose storage capacities (over 650 MB) exceeding the ruled capacity may be apparently copied. Moreover, a master CD for such irregular CDs may be formed, and also, other master CDs may be formed with respect to other CDs which have been manufactured irrespective of any limitations and standard rules. Therefore, in the virtual CD-R system of the present invention, many sorts of master virtual CDs can be manufactured. In addition, the virtual CDs which have been formed in the test purpose by the CD-Maker, or the virtual CDs whose contents have been desirably edited with having original tastes by the CD-Maker may be distributed via the networks, or may be distributed in the form of the actual CDs.

What is claimed is:

1. A CD system wherein:

while original data used to form a CD is processed, a virtual CD-R is formed in accordance with a structural requirement of the CD into a storage means employed in a computer wherein a virtual CD-R system is constructed in said storage means, and said virtual CD-R system is recognized in a similar manner to an actual CD-R drive based upon normal actual CD-R writing software, and also said virtual CD-R system is accessible and can form said virtual CD-R by using said normal actual CD-R writing software.

2. A CD system as claimed in claim 1 wherein the data is written by way of said CD-R writing software with respect to said virtual blank CD so as to form a virtual CD on said virtual drive, which can be utilized by any one of an OS and application software.

3. A CD system as claimed in claim 2 wherein said virtual CD is formed in such a manner that the data of said virtual CD can be deleted and also can also be rewritten by way of said CD-R writing software.

4. A CD system wherein a virtual CD-R system is constructed in a storage means employed in a computer, and said virtual CD-R system is recognized in a similar manner to an actual CD-R drive by way of normal actual CD-R writing software, and said virtual CD-R system can be accessed and can form a virtual CD-R by using the normal actual CD-R writing software; and wherein said CD system is comprised of:

a virtual drive panel capable of performing such operations that said virtual CD is inserted with respect to a virtual drive, a virtual blank CD is formed/mounted, and said virtual CD is ejected; and also capable of displaying such operation conditions as reading/writing of said virtual drive.

5. A CD system as claimed in claim 4 wherein CD-R writing software is called from an operation window of said virtual CD; a content of said virtual CD is transferred to an editing window of said CD-R writing software; and data is re-edited, deleted, and formed in accordance with a structural requirement of a CD under control of said CD-R writing software.

6. A CD system as claimed in claim 4 wherein a CD which has been once completed as a CD and then has been closed is formed as a virtual CD; the closed CD is opened on said virtual CD; and data can be additionally written and can be re-edited with respect to the opened CD.

7. A CD system wherein:

a program capable of co-operating a CD-R writing program part, a virtual CD-R interface program part, and a virtual CD-R drive program part, is stored into a storage means employed in a computer; and said CD-R writing program part is capable of performing a CD-R writing operation with respect to a virtual CD-R drive in a similar manner to that of an actual CD-R; said virtual CD-R interface program part is capable of realizing a user interface and a control operation, which are required for said virtual CD-R drive; and said virtual CD-R drive program part is capable of constructing and controlling said virtual CD-R.

8. A CD system as claimed in claim 7 wherein said virtual CD-R drive can be handled in a similar manner to the actual CD-R based upon any one of an OS, application software, and writing software.

* * * * *